(12) United States Patent
Selinger et al.

(10) Patent No.: US 7,455,828 B2
(45) Date of Patent: Nov. 25, 2008

(54) PROCESS AND APPARATUS FOR CONVERTING HYDROGEN SULFIDE INTO HYDROGEN AND SULFUR

(75) Inventors: Richard R. Selinger, Edmonton (CA); Brian R. Thicke, St. Albert (CA)

(73) Assignee: H2S Technologies, Ltd., Edmonton (CA)

( * ) Notice: Subject to any disclaimer, the term of this patent is extended or adjusted under 35 U.S.C. 154(b) by 974 days.

(21) Appl. No.: 10/790,530

(22) Filed: Mar. 1, 2004

(65) Prior Publication Data

US 2005/0191237 A1    Sep. 1, 2005

(51) Int. Cl.
*A62D 3/19* (2007.01)
*B01J 19/08* (2006.01)
*B01J 19/12* (2006.01)
*C01B 3/02* (2006.01)
*C01B 3/04* (2006.01)

(52) U.S. Cl. .................. 423/648.1; 423/228; 423/573.1; 423/658.2; 423/DIG. 10; 204/157.43; 204/157.49; 204/157.52; 422/129; 422/186.29; 422/187; 422/188; 422/189; 429/12

(58) Field of Classification Search .............. 423/228, 423/573.1, 648.1, 658.2, DIG. 10; 204/157.43, 204/157.49, 157.52; 422/129, 186.29, 187, 422/188, 189; 429/12

See application file for complete search history.

(56) References Cited

U.S. PATENT DOCUMENTS

| | | | |
|---|---|---|---|
| 3,933,608 A | 1/1976 | Haas et al. | |
| 5,211,923 A | 5/1993 | Harkness et al. | |
| 5,681,540 A * | 10/1997 | O'Brien | 423/573.1 |
| 5,793,013 A | 8/1998 | Read et al. | |
| 5,843,395 A | 12/1998 | Wang | |

FOREIGN PATENT DOCUMENTS

| | | |
|---|---|---|
| CA | 2204351 C | 5/1996 |
| CA | 2318709 A1 | 3/2001 |
| DE | 3526787 A1 | 1/1987 |

(Continued)

OTHER PUBLICATIONS

Dow Gas Treating Products and Services, Specialty Alkanolamines Products, Retrieved May 12, 2003, from http://www.dow.com/alkanolamines/dg_alk.htm.

(Continued)

*Primary Examiner*—Timothy C Vanoy
(74) *Attorney, Agent, or Firm*—Leydig, Voit & Mayer, Ltd.

(57) ABSTRACT

A process and apparatus for obtaining a hydrogen product and a sulfur product from a feed gas comprised of hydrogen sulfide. In the process, a first separating step separates the feed gas to obtain a first purified hydrogen sulfide fraction comprised of at least about 90 percent hydrogen sulfide by volume. A dissociating step dissociates hydrogen sulfide present in the first purified hydrogen sulfide fraction to convert it into a dissociated first purified hydrogen sulfide fraction comprised of elemental hydrogen and sulfur. A second separating step separates the dissociated first purified hydrogen sulfide fraction to obtain a hydrogen rich fraction comprised of elemental hydrogen. The sulfur product may also be obtained from the dissociated first purified hydrogen sulfide fraction. Finally, the hydrogen product is obtained from the hydrogen rich fraction. The apparatus is provided for performing the process.

69 Claims, 1 Drawing Sheet

FOREIGN PATENT DOCUMENTS

| | | |
|---|---|---|
| EP | 0 399 608 A2 | 11/1990 |
| EP | 0 455 285 A1 | 11/1991 |
| EP | 1 085 075 A1 | 3/2001 |
| FR | 2 620 436 A1 | 3/1989 |
| FR | 2 639 630 A1 | 6/1990 |
| JP | 56-45802 | 4/1981 |
| RU | 2 131 396 C1 | 6/1999 |
| WO | WO 00/56441 A1 | 9/2000 |

OTHER PUBLICATIONS

Exxonmobil Research and Engineering Company, Fuels Technologies, Retrieved Sep. 10, 2003, from http://www.prod.exxonmobil.com/refiningtechnologies/fuels/mn_flexsorb.html.

Luinstra, Converting Hydrogen Sulfide by the Claus Process, Retrieved Jun. 30, 2003, from http://www.nelliott.demon.co.uk/company/claus.html.

Natco Group, *Amine Gas Sweetening Systems*, 7, 531A1-A2 (2002).

Slimane et al., *Proceedings of the 2002 U.S. DOE Hydrogen Program Review*, 1-15 (2002).

The Chemical Engineers' Resource Page, Exploring the Claus Process, Retrieved Sep. 23, 2003, from http://www.cheresources.com/claus.shtml.

Weiland et al., 53$^{rd}$ *Annual Laurance Reid Gas Conditioning Conference* (2003).

Exxon Research & Engineering Company, *Flexsorb: Solvents for Selective $H_2S$ Removal*, 1-7 (published no later than Dec. 5, 2002).

Material Safety Data Sheet for Flexsorb SE EC9016A, Ondeo Nalco Canada Company (Nov. 26, 2003).

* cited by examiner

PROCESS AND APPARATUS FOR CONVERTING HYDROGEN SULFIDE INTO HYDROGEN AND SULFUR

FIELD OF INVENTION

The present invention relates to a process and an apparatus for obtaining a hydrogen product from a feed gas, wherein the feed gas is comprised of hydrogen sulfide and the hydrogen product is comprised of elemental hydrogen. Preferably, the process and the apparatus also obtain a sulfur product comprised of elemental sulfur.

BACKGROUND OF INVENTION

Many natural gas formations contain hydrogen sulfide, methane, carbon dioxide and other impurities or contaminants. Typically, these impurities or contaminants must be removed from the natural gas before the natural gas is suitable for use. Similarly, process gases, such as those resulting from gas refining processes or as a by-product of other industrial processes, may contain hydrogen sulfide, methane, carbon dioxide and other impurities or contaminants. These impurities or contaminants must also be removed or otherwise addressed prior to the disposal or further processing and handling of the process gas.

In this context, the term "sour gas" as used herein refers to a natural gas which contains quantities of methane and hydrogen sulfide, as well as one or more impurities or contaminants such as carbon dioxide. Further, the term "acid gas" as used herein refers to process gas or sour gas from which substantially all of the methane has been extracted, leaving hydrogen sulfide and carbon dioxide as the principal components. Methane is typically extracted from sour gas using conventional amine extraction processes known to those skilled in this area. The removal of the hydrogen sulfide from the sour gas, referred to as gas sweetening, as well as the production of acid gas by industry, results in quantities of hydrogen sulfide containing gas which must be disposed of.

In smaller plants or refineries, the hydrogen sulfide is often flared to the atmosphere. However, flaring of the hydrogen sulfide converts it to sulfur dioxide which is a major component of acid rain. Thus, flaring of the hydrogen sulfide, particularly in large quantities, is not desirable. Accordingly, in larger plants and refineries, the hydrogen sulfide is further processed in various sulfur extraction and recovery systems in order to reduce the volume of hydrogen sulfide to be disposed of. However, these systems tend to be costly and still tend to result in significant quantities of hydrogen sulfide which are required to be flared.

For instance, a conventional sulfur recovery process known as the "Claus Process" utilizes a two step process which results in the production of elemental sulfur and a "tail gas" from the hydrogen sulfide. The first step is a thermal step comprised of combining the gas, typically acid gas, with oxygen and heating it to the necessary temperature for combustion. The combustion products then undergo the second catalytic step. Specifically, the catalytic step is comprised of combining the combustion products with a catalyst which results in the production of elemental sulfur and a tail gas which includes a residual quantity of hydrogen sulfide. The tail gas is typically incinerated in a flare stack or a furnace and vented to the atmosphere.

Thus, it is a goal of the Claus Process to minimize the amount of hydrogen sulfide which is contained in the tail gas and thereby minimize the production of sulfur dioxide during flaring. Accordingly, specialized or improved catalysts have been developed for the second step which achieve higher conversion rates to sulfur. In addition, where desired, a third step, being a tail gas recovery step, may be performed on the tail gas following the catalytic step to further reduce the amount of residual hydrogen sulfur in the tail gas. For instance, conventional amine extraction processes or conventional amine plants or regenerators may be used to selectively remove further amounts of any residual hydrogen sulfide from the tail gas. In addition, a "tail gas recovery process" may be required to convert sulfur-containing impurities, such as COS, $CS_2$, $SO_2$ and sulfur aerosol, back into hydrogen sulfide for recycling back to the Claus Process.

However, the use of specialized catalysts and further processing steps tends to increase the overall cost of the sulfur recovery process, as well as increase the overall energy requirements of the process. Further, some sulfur dioxide continues to be produced and released to the atmosphere as a result of the flaring of unconverted hydrogen sulfide.

Further alternative approaches have also been utilized. However, as with the Claus Process, none of these alternative approaches have been found to be fully satisfactory.

For example, sour gas, acid gas and other industrial waste gases have been fed to a reactor, such as a plasma reactor or thermoelectric reactor, which causes the dissociation of the hydrogen sulfide into hydrogen and sulfur. Thus, both valuable sulfur products and potentially valuable hydrogen products are produced. However, the dissociation process also produces a number of other impurities or contaminants in the product stream resulting from the sour gas including COS, $CS_2$, $SO_2$, CO, $CO_2$, $H_2O$ and sulfur aerosols. Examples of the use of the dissociation process include European Patent Application 1,085,075 A1 published Mar. 21, 2001 by ABB Research Ltd, U.S. Pat. No. 5,843,395 issued Dec. 1, 1998 to Wang and PCT International Publication WO 00/56441 published Sep. 28, 2000 by Agarwal et. al.

U.S. Pat. No. 5,211,923 issued May 18, 1993 to Harkness et. al. particularly relates to a process which utilizes a microwave plasma reactor to produce sulfur and hydrogen from sour gas. The sour gas entering the plasma reactor includes a variety of impurities or contaminants including methane, carbon dioxide, hydrogen sulfide and various other substances containing carbon, hydrogen, sulfur and oxygen. As a result, the plasma reactor may utilize significant energy dissociating a number of compounds in the sour gas, in addition to the hydrogen sulfide. Further, the dissociation may well result in the production of various undesirable impurities or contaminants in the product stream as noted above.

Accordingly, Harkness et. al. specifically incorporates a catalytic reduction unit following the plasma reactor which serves to convert sulfur-containing impurities which exit the plasma reactor into a "hydrogen sulfide enhanced stream." Hydrogen is then separated from the hydrogen sulfide enhanced stream in a "purification step" and the remaining hydrogen sulfide is recycled back to the plasma reactor.

Finally, as indicated above, in addition to the production of sulfur products, hydrogen sulfide has been recognized as a potential feed stock for the production of hydrogen products. The development of hydrogen sulfide processing technologies for the production of hydrogen is also desirable given the increasing importance of, and need for, hydrogen for chemical processing and as a potential fuel source.

As a result, there is a need in the industry for a process and an apparatus for obtaining a hydrogen product, comprised of elemental hydrogen, from a feed gas comprised of hydrogen sulfide. Further, there is a need for a process and the apparatus which also obtain a sulfur product comprised of elemental sulfur. As well, there is a need for such a process and apparatus to be relatively energy and cost efficient and which minimize or reduce the amount of undesirable gases required to be flared or vented to the atmosphere.

SUMMARY OF INVENTION

The present invention relates to a process and an apparatus for obtaining a hydrogen product from a feed gas. The hydrogen product is preferably comprised of elemental hydrogen, while the feed gas is preferably comprised of hydrogen sulfide. In addition, the process and the apparatus also preferably obtain a sulfur product, which sulfur product is preferably comprised of elemental sulfur.

More particularly, in a first aspect of the present invention, the invention is comprised of a process for obtaining a hydrogen product from a feed gas, wherein the feed gas is comprised of hydrogen sulfide. In a second aspect of the invention, the invention is comprised of an apparatus for obtaining a hydrogen product from a feed gas, wherein the feed gas is comprised of hydrogen sulfide. The process as described herein may be performed in any apparatus or system capable of and suitable for performing each of the steps as outlined herein. However, preferably, the process is performed utilizing the apparatus as described herein, and preferably utilizing the preferred embodiment of the apparatus described herein.

Each of the process and apparatus may be used to obtain any desirable hydrogen product comprised of elemental hydrogen. However preferably, the hydrogen product is relatively "rich" such that it is comprised of a significant proportion or percentage of elemental hydrogen. In the preferred embodiment, the hydrogen product is a relatively pure product or as pure as reasonably practicable. In other words, the hydrogen product is comprised substantially or essentially of elemental hydrogen. Any other components or any contaminants in the hydrogen product are minimized, and preferably eliminated. As discussed further below, this pure hydrogen product may be used as a fuel source for powering the process and/or the apparatus.

Further, each of the process and the apparatus may obtain the hydrogen product from any type or source of feed gas comprised of hydrogen sulfide. For instance, the feed gas may be comprised of a natural gas, a process gas or mixtures thereof. Further, the feed gas may be comprised of a sour gas, an acid gas or any other gas or combinations thereof containing or comprised of one or more impurities or contaminants in addition to the hydrogen sulfide. In the preferred embodiment, the feed gas is comprised of an acid gas, wherein the acid gas is comprised of hydrogen sulfide ($H_2S$) and carbon dioxide ($CO_2$).

In the first aspect of the invention, the process is preferably comprised of the following steps:

(a) first separating the feed gas to obtain a first purified hydrogen sulfide fraction from the feed gas, wherein the first purified hydrogen sulfide fraction is comprised of at least about 90 percent hydrogen sulfide by volume;

(b) dissociating hydrogen sulfide present in the first purified hydrogen sulfide fraction into elemental hydrogen and elemental sulfur to convert the first purified hydrogen sulfide fraction into a dissociated first purified hydrogen sulfide fraction, wherein the dissociated first purified hydrogen sulfide fraction is comprised of elemental hydrogen and elemental sulfur;

(c) second separating the dissociated first purified hydrogen sulfide fraction to obtain a hydrogen rich fraction from the dissociated first purified hydrogen sulfide fraction, wherein the hydrogen rich fraction is comprised of elemental hydrogen; and (d) obtaining the hydrogen product from the hydrogen rich fraction, wherein the hydrogen product is comprised of elemental hydrogen.

As stated, the first separating step separates the feed gas to obtain a first purified hydrogen sulfide fraction from the feed gas. The first purified hydrogen sulfide fraction may be comprised of any proportion or percentage of hydrogen sulfide. However preferably, the first purified hydrogen sulfide fraction is relatively "rich" such that it is comprised of a significant proportion or percentage of hydrogen sulfide. More preferably, in order to enhance the effectiveness of the process and to enhance the desirability of the hydrogen product resulting therefrom, the first purified hydrogen sulfide fraction is comprised of a minimum percentage of hydrogen sulfide by volume in a range of about 90 to 100 percent.

Thus, the first purified hydrogen sulfide fraction is preferably comprised of at least about 90 percent hydrogen sulfide by volume, although a percentage of hydrogen sulfide by volume of at least about 94 percent is even more preferable. Further, in order to maximize the effectiveness of the process and produce highly desirable hydrogen and sulfur products, the first purified hydrogen sulfide fraction is most preferably comprised of at least about 98 or 99 percent hydrogen sulfide by volume. In other words, the percentage of hydrogen sulfide by volume is preferably maximized, while minimizing and preferably eliminating any contaminants or other components in the first purified hydrogen sulfide fraction. Thus, in the preferred embodiment, the first purified hydrogen sulfide fraction is as "pure" as reasonably practicable, being comprised of as high a percentage of hydrogen sulfide by volume as is reasonably practicable.

The first separating step may be comprised of any process, method or steps capable of, and suitable for, separating the hydrogen sulfide from the feed gas to obtain the first purified hydrogen sulfide fraction. More particularly, in the preferred embodiment wherein the feed gas is an acid gas, the first separating step may be comprised of any process, method or steps capable of, and suitable for, separating the hydrogen sulfide from the carbon dioxide comprising the acid gas to obtain the first purified hydrogen sulfide fraction.

However, preferably, the first separating step is comprised of the step of passing the feed gas through an amine based reagent which is capable of selectively absorbing hydrogen sulfide so that the first purified hydrogen sulfide fraction is absorbed by the amine based reagent. Depending upon the desired effectiveness of the first separating step, the passing step may be comprised of a single pass of the feed gas through the amine based reagent or a series or a plurality of passes of the feed gas through the amine based reagent. In addition, the first separating step is preferably further comprised of the step of regenerating the amine based reagent from the first purified hydrogen sulfide fraction to recover the amine based reagent from the first purified hydrogen sulfide fraction.

Any amine based reagent capable of selectively absorbing hydrogen sulfide may be used. "Selectively absorbing hydrogen sulfide" refers to the preferential absorption of hydrogen sulfide from the feed gas, while minimizing the absorption of any other components of or contaminants in the feed gas. Thus, in the preferred embodiment, the amine based reagent is selected to absorb and remove as much of the hydrogen sulfide from the feed gas as possible, while simultaneously absorbing and removing as little as possible of the other components of or contaminants in the feed gas, such as carbon dioxide. In other words, the hydrogen sulfide is preferentially absorbed to the exclusion of other components of the feed gas. In the preferred embodiment, the selective absorption results in the absorption of the first purified hydrogen sulfide fraction, preferably comprised of at least about 90 percent hydrogen sulfide by volume, as discussed in detail above. The regenerating step then recovers the amine based reagent to provide the first purified hydrogen sulfide fraction for further processing.

As stated, any amine based reagent capable of "selectively absorbing hydrogen sulfide" may be used, wherein the hydrogen sulfide is absorbed while minimizing the absorption of any other components of the feed gas. For instance, the amine based reagent may be comprised of monoethanolamine (MEA), diethanolamine (DEA), diglycolamine (DGA), diisopropanolamine (DIPA), methyldiethanolamine (MDEA), triethanolamine (TEA), UCARSOL™, SELEXOL™ and mixtures thereof. UCARSOL™ and SELEXOL™ are trade-marks of The Dow Chemical Company and refer to a group of amine solvents manufactured thereby.

In the preferred embodiment, the amine based reagent is comprised of a Flexsorb™ amine based reagent. Flexsorb™ is a trade-mark of Exxon Corporation and refers to a group of solvents comprised of amines and manufactured thereby by a proprietary process, including FLEXSORB SE™ and FLEXSORB SE PLUS™.

The dissociating step may be comprised of any process, method or steps capable of, and suitable for, dissociating the hydrogen sulfide present in the first purified hydrogen sulfide fraction into elemental hydrogen and elemental sulfur to convert the first purified hydrogen sulfide fraction into a dissociated first purified hydrogen sulfide fraction. The dissociated first purified hydrogen sulfide fraction is comprised of elemental hydrogen and elemental sulfur. In addition, as discussed further below, depending upon the efficacy or effectiveness of the dissociating step, the dissociated first purified hydrogen sulfide fraction may be further comprised of hydrogen sulfide.

Preferably, the dissociating step is comprised of dissociating hydrogen sulfide present in the first purified hydrogen sulfide fraction by thermal decomposition, which may also be referred to as thermal degradation. More preferably, the dissociating step is comprised of dissociating hydrogen sulfide present in the first purified hydrogen sulfide fraction by thermal decomposition under plasma conditions.

Accordingly, the dissociating step is preferably performed in a plasma reactor. Although any type or configuration of plasma reactor capable of performing the dissociating step may be used, in the preferred embodiment, the plasma reactor is driven by electromagnetic energy. Any form of electromagnetic energy may be used to drive the plasma reactor, such as radio-frequency ("RF") providing a RF-driven plasma reactor. However, the electromagnetic energy is preferably comprised of microwave energy.

Further, the dissociating step may be performed at any temperature and at any pressure suitable for dissociating hydrogen sulfide present in the first purified hydrogen sulfide fraction by thermal decomposition. For instance, the dissociating step is preferably performed at a temperature of less than about 3000 degrees Celsius. However, in the preferred embodiment, the dissociating step is performed at a temperature of between about 1500 degrees Celsius and about 2000 degrees Celsius. In other words, the dissociating step is performed at a temperature of between 1500 and 2000 degrees Celsius, which is intended to include a temperature which is between about or approximately the values indicated.

Further, the dissociating step may be performed at any pressure compatible with the apparatus being used to perform that step. For instance, when utilizing a microwave driven plasma reactor, the dissociating step may be performed at a broad range of gauge pressures from less than about 10 kilopascals (about 1.45 psi) to greater than about 1000 kilopascals (145 psi). Preferably, the dissociating step is performed at a gauge pressure of about 6 kilopascals (about 0.87 psi) to about 1000 kilopascals (145 psi). In the preferred embodiment, the dissociating step is performed at a gauge pressure of between about 200 kilopascals (about 29 psi) and about 500 kilopascals (about 72.5 psi). In other words, the dissociating step is performed at a gauge pressure of between 200 kilopascals (about 29 psi) and 500 kilopascals (about 72.5 psi), which is intended to include a pressure which is between about or approximately the values indicated.

As stated, the second separating step separates the dissociated first purified hydrogen sulfide fraction to obtain a hydrogen rich fraction from the dissociated first purified hydrogen sulfide fraction. The hydrogen rich fraction is comprised of elemental hydrogen. Further, the hydrogen rich fraction may be comprised of any proportion or percentage of elemental hydrogen. However, as indicated, the hydrogen rich fraction is preferably relatively "rich" such that it is comprised of a significant proportion or percentage of elemental hydrogen. In the preferred embodiment, the percentage of elemental hydrogen in the hydrogen rich fraction is maximized as much as reasonably practicable, while minimizing or reducing any contaminants or other components in the hydrogen rich fraction. In this regard, in order to enhance or improve the efficiency or effectiveness of the subsequent steps comprising the process, the second separating step preferably achieves or provides a hydrogen rich fraction comprised of at least about 40 percent elemental hydrogen by volume.

Where the hydrogen rich fraction is substantially or essentially comprised of elemental hydrogen, the hydrogen rich fraction may comprise the hydrogen product. In other words, the hydrogen product may be obtained by simply collecting the hydrogen rich fraction, wherein the hydrogen product is comprised of the hydrogen rich fraction. However, this may not be the case. Rather, the hydrogen rich fraction may be further comprised of hydrogen sulfide. In this case, further processing may be required to obtain the hydrogen product as discussed below.

In addition, the process may be further comprised of the step of obtaining a sulfur product from the dissociated first purified hydrogen sulfide fraction, wherein the sulfur product is comprised of elemental sulfur. The sulfur product may be comprised of any proportion or percentage of elemental sulfur. However, the sulfur product is preferably relatively "rich" such that it is comprised of a significant proportion or percentage of elemental sulfur. In other words, the percentage of elemental sulfur in the sulfur product is maximized, while minimizing any contaminants or other components in the sulfur product. In the preferred embodiment, the sulfur product is a relatively pure product or as pure as reasonably practicable. In other words, the sulfur product is comprised substantially or essentially of elemental sulfur. Any other components or any contaminants in the sulfur product are minimized, and preferably eliminated.

Thus, in the preferred embodiment, the dissociated first purified hydrogen sulfide fraction is separated to obtain a hydrogen rich fraction comprised of elemental hydrogen and to obtain a sulfur product comprised of elemental sulfur.

The second separating step may be comprised of any process, method or steps capable of, and suitable for, separating the dissociated first purified hydrogen sulfide fraction to obtain the hydrogen rich fraction. Specifically, the second separating step preferably separates the hydrogen rich fraction from the dissociated first purified hydrogen sulfide fraction. Further, in the preferred embodiment, the second separating step is comprised of a process, method or step or steps capable of, and suitable for, separating the dissociated first purified hydrogen sulfide fraction to obtain the hydrogen rich fraction and to obtain the sulfur product. Specifically, the second separating step may separate both the hydrogen rich fraction and the sulfur product from the dissociated first purified hydrogen sulfide fraction.

In addition, as discussed above, the dissociated first purified hydrogen sulfide fraction may be further comprised of hydrogen sulfide. In this instance, the second separating step is further comprised of obtaining a second purified hydrogen sulfide fraction from the dissociated first purified hydrogen sulfide fraction, wherein the second purified hydrogen sulfide fraction is comprised of hydrogen sulfide. The second purified hydrogen sulfide fraction may be comprised of any proportion or percentage of hydrogen sulfide. However preferably, the second purified hydrogen sulfide fraction is relatively "rich" such that it is comprised of a significant proportion or percentage of hydrogen sulfide. In other words, the percentage of hydrogen sulfide by volume is preferably maximized, while minimizing, and preferably eliminating, any contaminants or other components in the second purified hydrogen sulfide fraction. Thus, in the preferred embodiment, the second purified hydrogen sulfide fraction is as pure as reasonably practicable, being comprised of as high a percentage of hydrogen sulfide by volume as is reasonably practicable.

The step of obtaining the second purified hydrogen sulfide fraction from the dissociated first purified hydrogen sulfide fraction may be comprised of any process, method or step or steps capable of, and suitable for, obtaining the second purified hydrogen sulfide fraction. Preferably, the second separating step separates the second purified hydrogen sulfide fraction from the dissociated first purified hydrogen sulfide fraction. Accordingly, in the preferred embodiment, the second separating step separates the dissociated first purified hydrogen sulfide fraction to obtain the hydrogen rich fraction, to obtain the sulfur product and to obtain the second purified hydrogen sulfide fraction.

As indicated, the second purified hydrogen sulfide fraction may be obtained from the dissociated first purified hydrogen sulfide fraction in any manner and by any suitable method or process. For instance, the second purified hydrogen sulfide fraction may be obtained by centrifugally separating the dissociated first purified hydrogen sulfide fraction. Further, the second purified hydrogen sulfide fraction may be obtained by gravitationally separating the dissociated first purified hydrogen sulfide fraction.

In addition, in the preferred embodiment, the process further comprises the step of combining the second purified hydrogen sulfide fraction with the first purified hydrogen sulfide fraction. Thus, the hydrogen sulfide dissociating step as described above is conducted to dissociate the hydrogen sulfide present in both the first purified hydrogen sulfide fraction and the second purified hydrogen sulfide fraction. In other words, in the event an amount of hydrogen sulfide in the first purified hydrogen sulfide fraction is not dissociated by the dissociating step, this hydrogen sulfide is returned or recycled back or upstream of the dissociating step as the second purified hydrogen sulfide fraction for further dissociation of the hydrogen sulfide.

As well, the process is preferably further comprised of the step of cooling the dissociated first purified hydrogen sulfide fraction following the dissociating step in order to inhibit recombination of the elemental hydrogen and the elemental sulfur. The cooling step may be performed at any time following the dissociating step but prior to the substantial recombination of the elemental hydrogen and elemental sulfur. However, the cooling step is preferably performed immediately following the dissociating step. The cooling step is performed immediately following the dissociating step in order to enhance or maximize the inhibition of any potential recombination of the elemental hydrogen and elemental sulfur. In other words, rapid cooling of the dissociated first purified hydrogen sulfide fraction following the dissociating step minimizes or reduces any recombination of the elemental hydrogen and sulfur.

The cooling step may be comprised of any process, method, step or steps capable of, and suitable for, cooling the dissociated first purified hydrogen sulfide fraction to a temperature sufficient to inhibit recombination of the elemental hydrogen and the elemental sulfur. Further, the temperature is preferably selected to inhibit any substantial recombination thereof. Thus, the dissociated first purified hydrogen sulfide fraction is preferably cooled to a temperature at which the elemental hydrogen and the elemental sulfur are not reactive or not readily reactive.

In the preferred embodiment, the cooling step is comprised of cooling the dissociated first purified hydrogen sulfide fraction to a temperature less than about the boiling point of the elemental sulfur. In other words, the cooling step cools the dissociated first purified hydrogen sulfide fraction to a temperature less than the boiling point of the elemental sulfur, which is intended to include a temperature which is less than about or approximately the boiling point. The boiling point of elemental sulfur is about 717.9 K (about 445 degrees Celsius) at atmospheric pressure (or 0 gauge pressure). Accordingly, in the preferred embodiment, the cooling step is comprised of cooling the dissociated first purified hydrogen sulfide fraction to a temperature of less than about 445 degrees Celsius at atmospheric pressure.

As discussed above, the obtaining step is comprised of obtaining the hydrogen product from the hydrogen rich fraction, wherein the hydrogen product is comprised of elemental hydrogen. Further, as discussed above, the hydrogen rich fraction may be further comprised of hydrogen sulfide. In this instance, the hydrogen product obtaining step is preferably comprised of the step of third separating the hydrogen rich fraction to obtain the hydrogen product from the hydrogen rich fraction.

The third separating step separates the hydrogen rich fraction to obtain the hydrogen product. The third separating step may be comprised of any process, method, step or steps capable of, and suitable for, separating the hydrogen rich fraction to obtain the hydrogen product. More particularly, in the preferred embodiment, the third separating step may be comprised of any process, method, step or steps capable of, and suitable for, separating the elemental hydrogen from any other components of the hydrogen rich fraction, such as any hydrogen sulfide therein, to obtain the hydrogen product.

However, preferably, the third separating step is comprised of the step of passing the hydrogen rich fraction through an amine based reagent which is capable of selectively absorbing hydrogen sulfide to obtain a third purified hydrogen sulfide fraction, wherein the third purified hydrogen sulfide fraction is comprised of hydrogen sulfide and wherein the third purified hydrogen sulfide fraction is absorbed by the amine based reagent. Depending upon the desired effectiveness of the third separating step, the passing step may be comprised of a single pass of the hydrogen rich fraction through the amine based reagent or a series or a plurality of passes of the hydrogen rich fraction through the amine based reagent. In addition, the third separating step is preferably further comprised of the step of regenerating the amine based reagent from the third purified hydrogen sulfide fraction to recover the amine based reagent from the third purified hydrogen sulfide fraction.

The third purified hydrogen sulfide fraction may be comprised of any proportion or percentage of hydrogen sulfide. However preferably, the third purified hydrogen sulfide fraction is relatively "rich" such that it is comprised of a significant proportion or percentage of hydrogen sulfide. In other words, the percentage of hydrogen sulfide by volume is preferably maximized, while minimizing, and preferably eliminating, any contaminants or other components in the third purified hydrogen sulfide fraction. Thus, in the preferred embodiment, the third purified hydrogen sulfide fraction is as pure as reasonably practicable, being comprised of as high a percentage of hydrogen sulfide by volume as is reasonably practicable.

Further, the step of passing the hydrogen rich fraction through the amine based reagent to selectively absorb hydrogen sulfide results in the obtaining of the third purified hydrogen sulfide fraction as well as the obtaining of the hydrogen product. In other words, any remaining hydrogen sulfide in the hydrogen rich fraction is preferably removed, which results in or provides the hydrogen product.

As with the first separating step, any amine based reagent capable of selectively absorbing hydrogen sulfide may be used for the third separating step. "Selectively absorbing hydrogen sulfide" with reference to the third separating step is defined in the same manner as above in relation to the first separating step and thus has the same meaning. Specifically, "selectively absorbing hydrogen sulfur" in this step refers to the preferential absorption of hydrogen sulfide from the hydrogen rich fraction, while minimizing the absorption of any other components of the hydrogen rich fraction including elemental hydrogen. Thus, in the preferred embodiment, the amine based reagent is selected to absorb and remove as much of the hydrogen sulfide from the hydrogen rich fraction as possible, while simultaneously absorbing and removing as little as possible of the other components of the hydrogen rich fraction, particularly elemental hydrogen. In other words, the hydrogen sulfide is preferentially absorbed to the exclusion of other components of the hydrogen rich fraction. In the preferred embodiment, the selective absorption results in the absorption of the third purified hydrogen sulfide fraction. The regenerating step then recovers the amine based reagent to provide the third purified hydrogen sulfide fraction for further processing.

As stated, any amine based reagent capable of "selectively absorbing hydrogen sulfide" may be used, wherein the hydrogen sulfide is absorbed while minimizing the absorption of any other components of the hydrogen rich fraction. For instance, as with the first separating step, the amine based reagent may be comprised of monoethanolamine (MEA), diethanolamine (DEA), diglycolamine (DGA), diisopropanolamine (DIPA), methyldiethanolamine (MDEA), triethanolamine (TEA), UCARSOL™, SELEXOL™ and mixtures thereof. In the preferred embodiment, the amine based reagent is comprised of a Flexsorb™ amine based reagent.

In addition, in the preferred embodiment, the process further comprises the step of combining the third purified hydrogen sulfide fraction with the first purified hydrogen sulfide fraction. Thus, the hydrogen sulfide dissociating step as described above is conducted to dissociate the hydrogen sulfide present in both the first purified hydrogen sulfide fraction and the third purified hydrogen sulfide fraction. In other words, in the event an amount of hydrogen sulfide remains in the hydrogen rich fraction, this hydrogen sulfide is returned or recycled back or upstream of the dissociating step as the third purified hydrogen sulfide fraction for further dissociation of the hydrogen sulfide.

As indicated above, the amine based reagent is preferably regenerated from the first purified hydrogen sulfide fraction, the third purified hydrogen sulfide fraction or both the first and third purified hydrogen sulfide fractions to recover the amine based reagent therefrom. Thus, the first separating step may be comprised of the step of regenerating the amine based reagent from the first purified hydrogen sulfide fraction. Similarly, the third separating step may be comprised of the step of regenerating the amine based reagent from the third purified hydrogen sulfide fraction. However, in the preferred embodiment, the process further comprises the step of regenerating the amine based reagent from the first purified hydrogen sulfide fraction and the third hydrogen sulfide fraction to recover the amine based reagent from the first purified hydrogen sulfide fraction and the third purified hydrogen sulfide fraction.

Finally, the process is preferably further comprised of the step of delivering the hydrogen product to a fuel cell in order to produce electrical energy from the hydrogen product. The fuel cell may be any type of hydrogen engine capable of producing electrical energy from the hydrogen product. The electrical energy produced by the fuel cell is preferably utilized to power all or a portion of the process or to supplement a further electrical energy source to improve the energy efficiency of the process. In the preferred embodiment, the process is further comprised of the step of using in the dissociating step the electrical energy produced by the fuel cell.

The apparatus of the within invention, and each of the components or elements thereof, is preferably utilized in the performance of the method of the within invention, and each of the steps thereof. Accordingly, the same meanings are applicable with respect to the terminology used in relation to the apparatus as provided or defined previously in relation to the process.

In the second aspect of the invention, the invention is comprised of an apparatus for obtaining a hydrogen product from a feed gas, wherein the feed gas is comprised of hydrogen sulfide, the apparatus preferably comprising:

(a) a first separating apparatus for first separating the feed gas to obtain a first purified hydrogen sulfide fraction from the feed gas such that the first purified hydrogen sulfide fraction is comprised of at least about 90 percent hydrogen sulfide by volume;

(b) a dissociating apparatus for dissociating hydrogen sulfide present in the first purified hydrogen sulfide fraction into elemental hydrogen and elemental sulfur to convert the first purified hydrogen sulfide fraction into a dissociated first purified hydrogen sulfide fraction, wherein the dissociated first purified hydrogen sulfide fraction is comprised of elemental hydrogen and elemental sulfur;

(c) a second separating apparatus for second separating the dissociated first purified hydrogen sulfide fraction to obtain a hydrogen rich fraction from the dissociated first purified hydrogen sulfide fraction, wherein the hydrogen rich fraction is comprised of elemental hydrogen; and (d) a third separating apparatus for third separating the hydrogen rich fraction to obtain the hydrogen product from the hydrogen rich fraction, wherein the hydrogen product is comprised of elemental hydrogen.

The first separating apparatus is provided and adapted for first separating the feed gas to obtain the first purified hydrogen sulfide fraction from the feed gas. The first separating apparatus may be comprised of any apparatus, mechanism or device suitable for and capable of separating the feed gas to obtain the first purified hydrogen sulfide fraction comprised of a desired percentage or proportion of hydrogen sulfide. In this regard, as discussed above, the first purified hydrogen sulfide fraction is preferably relatively "rich" such that it is comprised of a significant proportion or percentage of hydrogen sulfide. Specifically, the first purified hydrogen sulfide fraction is preferably comprised of at least about 90 percent hydrogen sulfide by volume.

Thus, in the preferred embodiment, the first separating apparatus may be comprised of any apparatus, mechanism or device suitable for and capable of separating the feed gas to obtain the first purified hydrogen sulfide fraction such that the first purified hydrogen sulfide fraction is comprised of at least about 90 percent hydrogen sulfide by volume. Accordingly, the first separating apparatus preferably maximizes the percentage of hydrogen sulfide by volume while minimizing any contaminants or other components in the first purified hydrogen sulfide fraction, such as carbon dioxide.

Preferably, the first separating apparatus is comprised of at least one absorber vessel. Depending upon the desired effectiveness of the first separating apparatus, the first separating apparatus may be comprised of a single absorber vessel for performing a single pass or multiple passes of the feed gas therethrough. Alternatively, the first separating apparatus may be comprised of a plurality of absorber vessels connected in series for performing a single pass or multiple passes of the feed gas therethrough. Any type or configuration of absorber vessel may be used which is suitable for selectively absorbing hydrogen sulfide so that the first purified hydrogen sulfide fraction is absorbed in the absorber vessel. Further, the first separating apparatus is preferably comprised of a reagent which is capable of selectively absorbing hydrogen sulfide so that the first purified hydrogen sulfide fraction is absorbed by the reagent.

Although any suitable reagent capable of performing this function may be used, the first separating apparatus is preferably further comprised of an amine based reagent which is capable of "selectively absorbing hydrogen sulfide" so that the first purified hydrogen sulfide fraction is absorbed by the amine based reagent. Any amine based reagent capable of "selectively absorbing hydrogen sulfide," as this term is defined above in relation to the first separating step, may be used. In the preferred embodiment, the selective absorption results in the absorption of the first purified hydrogen sulfide fraction, preferably comprised of at least about 90 percent hydrogen sulfide by volume.

As stated, any amine based reagent capable of selectively absorbing hydrogen sulfide such that the hydrogen sulfide is preferentially absorbed while minimizing the absorption of any other components of the feed gas, such as those amine based reagents listed previously in relation to the first separating step, may comprise the first separating apparatus. However, in the preferred embodiment of the apparatus, the amine based reagent is comprised of a Flexsorb™ amine based reagent.

In addition, the first separating apparatus may be further comprised of a regenerator for recovering the reagent, preferably the amine based reagent, from the first purified hydrogen sulfide fraction. In this instance, the regenerator is preferably in communication with both of the absorber vessel of the first separating apparatus and the dissociating apparatus so that the first purified hydrogen sulfide fraction passes from the absorber vessel to the regenerator and from the regenerator to the dissociating apparatus.

The dissociating apparatus may be comprised of any apparatus, mechanism or device suitable for and capable of dissociating hydrogen sulfide present in the first purified hydrogen sulfide fraction into elemental hydrogen and elemental sulfur to convert the first purified hydrogen sulfide fraction into the dissociated first purified hydrogen sulfide fraction. The dissociated first purified hydrogen sulfide fraction is comprised of elemental hydrogen and elemental sulfur, and may be further comprised of hydrogen sulfide.

Preferably, the dissociating apparatus is comprised of a reactor capable of dissociating hydrogen sulfide by thermal decomposition, preferably under plasma conditions. Accordingly, the dissociating apparatus is preferably comprised of a plasma reactor. Although any type or configuration of plasma reactor capable of dissociating hydrogen sulfide may be used, in the preferred embodiment, the plasma reactor is driven by electromagnetic energy. Any form of electromagnetic energy may be used to drive the plasma reactor, such as radio-frequency ("RF") providing a RF-driven plasma reactor. However, the electromagnetic energy is preferably comprised of microwave energy providing a microwave driven plasma reactor.

Finally, the dissociating apparatus may provide any operating temperature and operating pressure suitable for dissociating hydrogen sulfide and which are compatible with the particular dissociating apparatus. For instance, where the dissociating apparatus is comprised of a microwave driven plasma reactor, the dissociating apparatus is preferably capable of providing an operating temperature of less than about 3000 degrees Celsius. However, in the preferred embodiment, the dissociating apparatus is capable of providing an operating temperature of between about 1500 degrees Celsius and about 2000 degrees Celsius. In other words, the dissociating apparatus is capable of providing an operating temperature of between 1500 and 2000 degrees Celsius, which is intended to include a temperature which is between about or approximately the values indicated.

As well, where the dissociating apparatus is comprised of a microwave driven plasma reactor, the dissociating apparatus may be capable of providing a broad range of operating gauge pressures from less than about 10 kilopascals (about 1.45 psi) to greater than about 1000 kilopascals (145 psi). Preferably, the dissociating apparatus is capable of providing an operating gauge pressure of about 6 kilopascals (about 0.87 psi) to about 1000 kilopascals (145 psi). In the preferred embodiment, the dissociating apparatus is capable of providing an operating gauge pressure of between about 200 kilopascals (about 29 psi) and about 500 kilopascals (about 72.5 psi). In other words, the dissociating apparatus is capable of providing an operating gauge pressure of between 200 kilopascals (about 29 psi) and 500 kilopascals (about 72.5 psi), which is intended to include a gauge pressure which is between about or approximately the values indicated.

The second separating apparatus may be comprised of any apparatus, mechanism or device capable of, and suitable for, second separating the dissociated first purified hydrogen sulfide fraction to obtain the hydrogen rich fraction. Specifically, the second separating apparatus preferably separates the hydrogen rich fraction from the dissociated first purified hydrogen sulfide fraction. Thus, in the preferred embodiment, the second separating apparatus is further comprised of an outlet for the hydrogen rich fraction. The hydrogen rich fraction is comprised of elemental hydrogen. Further, as described previously, the hydrogen rich fraction may be comprised of any proportion or percentage of elemental hydrogen, however, the hydrogen rich fraction is preferably relatively "rich" such that it is comprised of a significant proportion or percentage of elemental hydrogen. In this regard, in order to enhance or improve the efficiency or effectiveness of the subsequent components comprising the apparatus, the second separating apparatus preferably achieves or provides a hydrogen rich fraction comprised of at least about 40 percent elemental hydrogen by volume.

In addition, the second separating apparatus may be further comprised of a sulfur collector for collecting a sulfur product. In this instance, the sulfur collector preferably obtains the sulfur product from the dissociated first purified hydrogen sulfide fraction, wherein the sulfur product is comprised of elemental sulfur, as discussed in detail above in relation to the process. The sulfur collector may be comprised of any apparatus, mechanism or device capable of, and suitable for, collecting the sulfur product from the dissociated first purified hydrogen sulfide fraction. Specifically, the second separating apparatus preferably separates the dissociated first purified hydrogen sulfide fraction to obtain the sulfur product, which is then collected by the sulfur collector. Further, in the preferred embodiment, the sulfur collector is comprised of a sulfur outlet.

As well, the second separating apparatus is preferably further comprised of a separator for obtaining a second purified hydrogen sulfide fraction from the dissociated first purified hydrogen sulfide fraction. More particularly, the separator preferably separates the dissociated first purified hydrogen sulfide fraction to obtain the second purified hydrogen sulfide fraction. As discussed previously in relation to the process, the second purified hydrogen sulfide fraction may be comprised of any proportion or percentage of hydrogen sulfide. However, the second purified hydrogen sulfide fraction is preferably relatively "rich" such that it is comprised of a significant proportion or percentage of hydrogen sulfide. The separator may be comprised of any apparatus, mechanism or device suitable for and capable of obtaining the second purified hydrogen sulfide fraction from the dissociated first purified hydrogen sulfide fraction, such as a centrifugal separator or a gravitational separator.

The second separating apparatus is preferably further comprised of an outlet for the second purified hydrogen sulfide fraction. In the preferred embodiment, the outlet for the second purified hydrogen sulfide fraction is in communication with the dissociating apparatus so that the second purified hydrogen sulfide fraction is dissociated by the dissociating apparatus.

Accordingly, in the preferred embodiment, the second separating apparatus separates the dissociated first purified hydrogen sulfide fraction to obtain a hydrogen rich fraction, a sulfur product and a second purified hydrogen sulfide fraction. Further, the second separating apparatus is preferably comprised of an outlet for the hydrogen rich fraction, a sulfur outlet and an outlet for the second purified hydrogen sulfide fraction.

Finally, the second separating apparatus is also preferably comprised of a second separating apparatus heat exchanger for cooling the dissociated first purified hydrogen sulfide fraction in order to inhibit recombination of the elemental hydrogen and the elemental sulfur, as discussed in detail in relation to the process. The second separating apparatus is preferably in proximate or direct communication with the dissociating apparatus such that the second separating apparatus heat exchanger is capable of rapidly or immediately cooling the dissociated first purified hydrogen sulfide fraction exiting from the dissociating apparatus in order to minimize or reduce any recombination of the elemental hydrogen and sulfur.

The second separating apparatus heat exchanger may be comprised of any apparatus, mechanism or device capable of, and suitable for, cooling the dissociated first purified hydrogen sulfide fraction to a temperature sufficient to inhibit recombination, and preferably to a temperature sufficient to inhibit any substantial recombination, of the elemental hydrogen and the elemental sulfur. In the preferred embodiment, the second separating apparatus heat exchanger is comprised of an apparatus, mechanism or device capable of, and suitable for, cooling the dissociated first purified hydrogen sulfide fraction to a temperature less than about the boiling point of the elemental sulfur, as discussed above in relation to the process.

As indicated, the apparatus of the within invention is also comprised of the third separating apparatus for third separating the hydrogen rich fraction to obtain the hydrogen product from the hydrogen rich fraction, wherein the hydrogen product is comprised of elemental hydrogen. The third separating apparatus may be comprised of any apparatus, mechanism or device suitable for and capable of separating the hydrogen rich fraction to obtain the hydrogen product from the hydrogen rich fraction, as discussed and defined above relating to the process. Therefore, the third separating apparatus is preferably capable of producing or providing a relatively "rich" hydrogen product.

Preferably, the third separating apparatus is comprised of at least one absorber vessel. Depending upon the desired effectiveness of the third separating apparatus, the third separating apparatus may be comprised of a single absorber vessel for performing a single pass or multiple passes of the hydrogen rich fraction therethrough. Alternatively, the third separating apparatus may be comprised of a plurality of absorber vessels connected in series for performing a single pass or multiple passes of the hydrogen rich fraction therethrough. Any type or configuration of absorber vessel may be used which is suitable for selectively absorbing hydrogen sulfide so that a third purified hydrogen sulfide fraction is absorbed in the absorber vessel. Further, the third separating apparatus is preferably comprised of a reagent which is capable of selectively absorbing hydrogen sulfide so that the third purified hydrogen sulfide fraction is absorbed by the reagent.

Although any suitable reagent capable of performing this function may be used, the third separating apparatus is preferably further comprised of an amine based reagent which is capable of selectively absorbing hydrogen sulfide. Thus, in the preferred embodiment, the third separating apparatus is further comprised of an amine based reagent which is capable of selectively absorbing hydrogen sulfide so that a third purified hydrogen sulfide fraction is absorbed by the amine based reagent.

Any amine based reagent capable of "selectively absorbing hydrogen sulfide," as this term is defined above in relation to the third separating step, such that the hydrogen sulfide is preferentially absorbed while minimizing the absorption of any other components of the hydrogen rich fraction, may be used. In the preferred embodiment, the selective absorption results in the absorption of the third purified hydrogen sulfide fraction, as defined previously. For instance, any amine based reagent listed previously in relation to the third separating step may comprise the third separating apparatus. However, in the preferred embodiment, the amine based reagent is comprised of a Flexsorb™ amine based reagent.

In addition, the third separating apparatus may be further comprised of a regenerator for recovering the reagent, preferably the amine based reagent, from the third purified hydrogen sulfide fraction. In this instance, the regenerator is preferably in communication with both of the absorber vessel of the third separating apparatus and the dissociating apparatus so that the third purified hydrogen sulfide fraction passes from the absorber vessel to the regenerator and from the regenerator to the dissociating apparatus.

As indicated above, both the first separating apparatus and the third separating apparatus may each be comprised of a regenerator. However, in the preferred embodiment, a single regenerator is provided. In particular, the apparatus of the within invention is further comprised of a regenerator for recovering the reagent, preferably the amine based reagent, from the first purified hydrogen sulfide fraction and the third purified hydrogen sulfide fraction. In this instance, the regenerator is preferably in communication with each of the first separating apparatus, the third separating apparatus and the dissociating apparatus so that the first purified hydrogen sulfide fraction and the third purified hydrogen sulfide fraction pass from the first separating apparatus and the third separating apparatus to the regenerator and from the regenerator to the dissociating apparatus.

In addition, in the preferred embodiment, the regenerator is comprised of a regenerator heat exchanger for heating the first purified hydrogen sulfide fraction and the third purified hydrogen sulfide fraction. The regenerator heat exchanger may be comprised of any apparatus, mechanism or device capable of, and suitable for, heating the first and third purified hydrogen sulfide fractions to a desired temperature sufficient to enhance the operation of the regenerator and to facilitate the recovery of the amine based reagent from the first and third purified hydrogen sulfide fractions.

As indicated above, the second separating apparatus is preferably comprised of a second separating apparatus heat exchanger for cooling the dissociated first purified hydrogen sulfide fraction in order to inhibit recombination of the elemental hydrogen and the elemental sulfur. In this case, the regenerator heat exchanger and the second separating apparatus heat exchanger are preferably associated such that heat from the second separating apparatus is transferred to the regenerator. The regenerator heat exchanger and the second separating apparatus heat exchanger may be associated in any manner permitting the reasonably effective transfer of heat therebetween.

Finally, the apparatus is preferably further comprised of a fuel cell for producing electrical energy from the hydrogen product. As discussed above in relation to the process, the fuel cell may be any type of hydrogen engine capable of producing electrical energy from the hydrogen product. The electrical energy produced by the fuel cell is preferably utilized to power all or a portion of the apparatus or to supplement a further electrical energy source to improve the energy efficiency of the apparatus. In the preferred embodiment, the fuel cell is electrically connected with the dissociating apparatus so that the electrical energy is used to power the dissociating apparatus.

SUMMARY OF DRAWINGS

Embodiments of the invention will now be described with reference to the accompanying drawing, in which.

DETAILED DESCRIPTION

Figure 1:
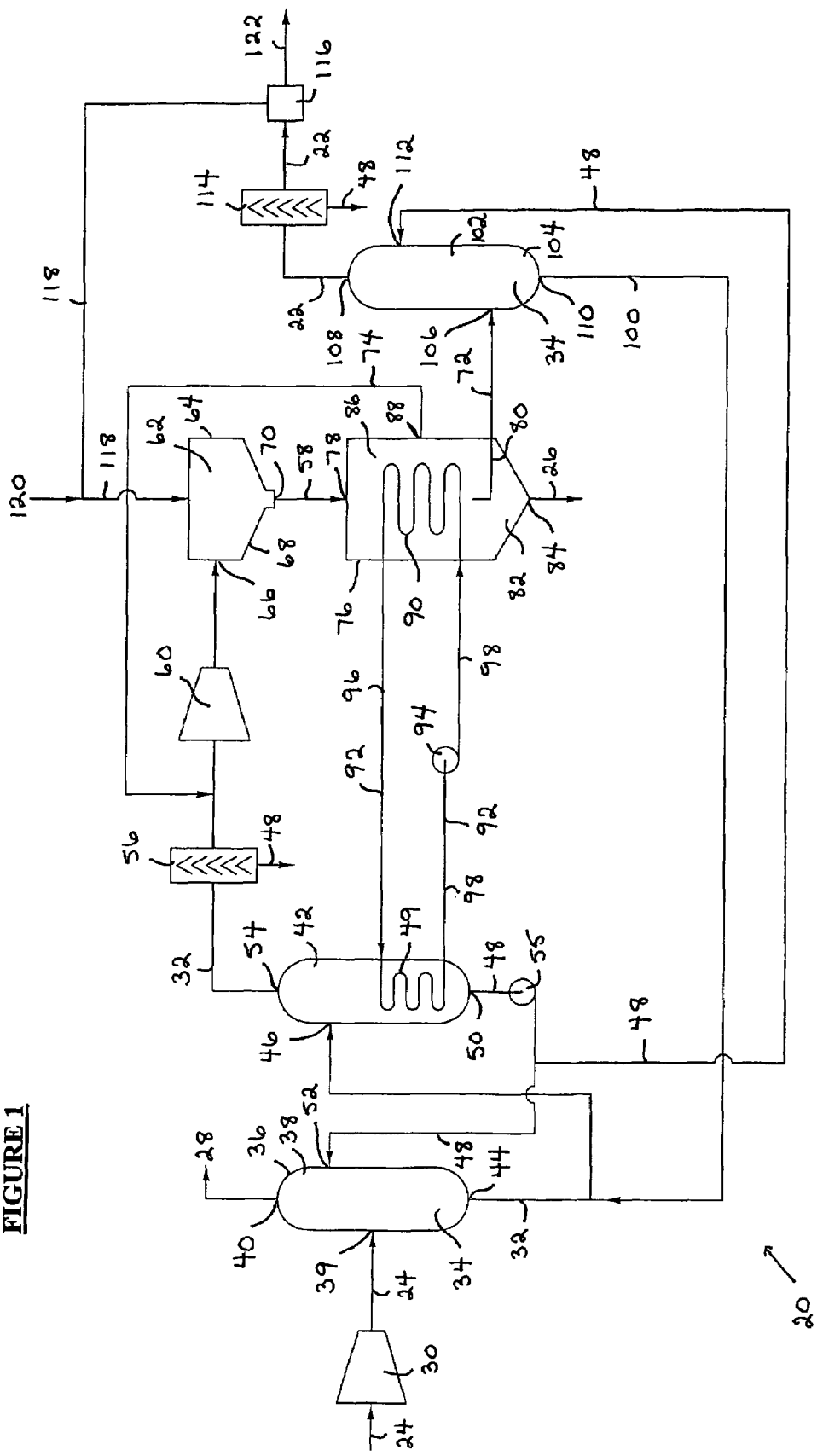
FIG. 1 is a schematic of a preferred embodiment of the apparatus of the within invention for use in the performance of a preferred embodiment of the process of the within invention.

Referring to FIG. 1, a process and an apparatus (20) are provided for obtaining a hydrogen product (22) from a feed gas (24). The hydrogen product (22) is comprised of elemental hydrogen, while the feed gas (24) is comprised of hydrogen sulfide. Further, the process and the apparatus (20) are also preferably provided for obtaining a sulfur product (26) comprised of elemental sulfur. Finally, any selected impurities or contaminants contained in the feed gas (24), such as carbon dioxide, are separated and produced independently of the hydrogen and sulfur products (22, 26) as a contaminant product (28).

Thus, in the preferred embodiment, the process and apparatus (20) result in the creation of three product streams. A first product stream is a contaminant or carbon dioxide stream which provides the contaminant product (28). The second product stream is a sulfur stream, particularly a liquid sulfur stream, which provides the sulfur product (26). The third product stream is a hydrogen stream which provides the hydrogen product (22). It is believed that through optimization of the apparatus (20) and process steps, the sulfur product (26) will be a relatively pure product comprised essentially or substantially of elemental sulfur, the hydrogen product (22) will be a relatively pure product comprised essentially or substantially of elemental hydrogen and the contaminant product (28) will be comprised of carbon dioxide and will include little or no sulfur. Thus, the contaminant product (28) may be readily disposed of without the need to release any sulfur, or any significant quantity of sulfur, to the atmosphere.

The process and the apparatus (20) are preferably relatively energy and cost efficient as compared with prior hydrogen sulfide processing technologies. Further, in the preferred embodiment, the amount or quantity of undesirable gases required to be flared or vented to the atmosphere is minimized. Thus, the apparatus (20) and process are also relatively environmentally friendly or safe as compared with prior hydrogen sulfide processing technologies.

As indicated, the process and apparatus (20) are provided for obtaining the hydrogen product (22) from the feed gas (24). Although the process may be performed in any apparatus or system capable of and suitable for performing each of the steps of the process as described herein, the process is preferably performed utilizing the preferred embodiment of the apparatus (20) as described herein. Accordingly, the terminology as used and defined in relation to one of the process and the apparatus (20) is equally applicable with respect to the other of the process and the apparatus (20).

Any desirable hydrogen product (22) comprised of elemental hydrogen may be obtained by the process and apparatus (20). However, preferably, the hydrogen product (22) is relatively "rich" such that it is comprised of a significant proportion or percentage of elemental hydrogen by volume. In the preferred embodiment, the hydrogen product (22) is relatively pure or as pure as reasonably practicable. Thus, the hydrogen product (22) is comprised substantially or essentially of elemental hydrogen. Any other components or any contaminants in the hydrogen product (22) are minimized, and preferably eliminated. It is desirable to target or aim to obtain a hydrogen product (22) comprised of at least about 95% by volume of elemental hydrogen. A pure product is preferred as the hydrogen product (22) is used as a fuel source in the preferred embodiment for powering the process and/or the apparatus (20).

In addition, any desirable sulfur product (26) comprised of elemental sulfur may be obtained by the process and apparatus (20). However, preferably, the sulfur product (26) is also relatively "rich" such that it is comprised of a significant proportion or percentage of elemental sulfur by volume. In the preferred embodiment, the sulfur product (26) is relatively pure or as pure as reasonably practicable. Thus, the sulfur product (26) is comprised substantially or essentially of elemental sulfur. Any other components or any contaminants in the sulfur product (26) are minimized, and preferably eliminated. It is also desirable to target or aim to obtain a sulfur product (26) comprised of at least about 95% by weight of elemental sulfur.

Further, any type or source of feed gas (24) comprised of hydrogen sulfur may be used in the process and apparatus (20). For instance, the feed gas (24) may be comprised of a natural gas, a process gas or mixtures or combinations thereof. Further, the feed gas (24) may be comprised of a sour gas, an acid gas or any other gas containing or comprised of one or more impurities or contaminants in addition to the hydrogen sulfide. In the preferred embodiment, the feed gas (24) is comprised of an acid gas, wherein the acid gas is comprised of hydrogen sulfide ($H_2S$) and carbon dioxide ($CO_2$). For instance, the acid gas may be provided from the flare line of an existing processing or industrial plant.

The feed gas (24) may be at any pressure throughout the process compatible with the particular process step being performed and compatible with the particular component of the apparatus (20) performing the process step. However, in the preferred embodiment, the feed gas (24) is typically initially provided at a gauge pressure of about 0-10 psi or $1b/in^2$ (about 0-68.95 kilopascals). Prior to conducting the first process step, as described below, the pressure of the feed gas (24) is preferably increased to a gauge pressure of about 10-15 psi or $1b/in^2$ (about 68.95-103.425 kilopascals). Thus, the apparatus (20) is preferably comprised of a compressor (30), which is also referred to herein as the first compressor (30), for pressurizing the feed gas (24) to the desired gauge pressure. In this regard, any type or manner of first compressor (30) capable of pressurizing the feed gas (24) to the desired gauge pressure may be used.

Next, the process is comprised of the step of first separating the feed gas (24) to obtain a first purified hydrogen sulfide fraction (32) from the feed gas (24). More particularly, the first separating step separates the feed gas (24) to obtain both the first purified hydrogen sulfide fraction (32) and the contaminant product (28).

The first purified hydrogen sulfide fraction (32) may be comprised of any proportion or percentage of hydrogen sulfide. However, preferably, the first purified hydrogen sulfide fraction (32) is relatively "rich" such that it is comprised of a significant proportion or percentage of hydrogen sulfide by volume. More preferably, in order to enhance the effectiveness of the process and apparatus (20) of the within invention and to enhance the desirability and purity of the hydrogen and sulfur products (22, 26) resulting therefrom, the first purified hydrogen sulfide fraction (32) is comprised of a minimum percentage of hydrogen sulfide by volume in a range of about 90 to 100%. Thus, the first purified hydrogen sulfide fraction (32) is comprised of at least about 90% hydrogen sulfide by volume, although a percentage of hydrogen sulfide by volume of at least about 94% is more preferable. Further, to produce highly desirable hydrogen and sulfur products (22, 26), the first purified hydrogen sulfide fraction (32) is most preferably comprised of at least about 98 or 99% hydrogen sulfide by volume. In other words, the first separating step preferably maximizes the percentage of hydrogen sulfide by volume, while minimizing contaminants or other components, in the first purified hydrogen sulfide fraction (32). Any contaminants, such as carbon dioxide, in the feed gas (24) are separated into the contaminant product (28).

Accordingly, in the preferred embodiment, the first separating step results in the first purified hydrogen sulfide fraction (32) being as "pure" as reasonably practicable such that it is comprised of as high a percentage of hydrogen sulfide by volume as is reasonably practicable. As a result, the contaminant product (28) is comprised of the contaminants, particularly carbon dioxide, from the feed gas (24) and as low a percentage of hydrogen sulfide as reasonably practicable. In other words, as large a percentage of the hydrogen sulfide in the feed gas (24) as is reasonably practicable is directed into the first purified hydrogen sulfide fraction (32), while as large a percentage of the carbon dioxide and other contaminants in the feed gas (24) as is reasonably practicable is directed into the contaminant product (28). In the preferred embodiment, the contaminant product (28) is comprised of equal to or less than about 200 ppm of hydrogen sulfide. Thus, the contaminant product (28) may be incinerated or may be flared or vented to the atmosphere. Alternately, the contaminant product (28) may be disposed of in an alternate manner or further processing may be performed on the contaminant product (28).

The particular proportion or percentage of elemental hydrogen comprising the hydrogen product (22) is dependent, at least in part, upon the purity of the first purified hydrogen sulfide fraction (32) or the percentage or proportion of hydrogen sulfide therein. Specifically, the greater the purity of the first purified hydrogen sulfide fraction (32), the greater the purity of the hydrogen product (22) which is achievable or obtainable by the within invention. Thus, the percentage or proportion of hydrogen sulfide in the first purified hydrogen sulfide fraction (32) is selected in order to obtain or achieve the desired target percentage or proportion of elemental hydrogen in the hydrogen product (22), which is preferably at least about 95% by volume of elemental hydrogen.

The particular proportion or percentage of elemental sulfur comprising the sulfur product (26) is also dependent, at least in part, upon the purity of the first purified hydrogen sulfide fraction (32) or the percentage or proportion of hydrogen sulfide therein. Specifically, the greater the purity of the first purified hydrogen sulfide fraction (32), the greater the purity of the sulfur product (26) which is achievable or obtainable by the within invention. Thus, the percentage or proportion of hydrogen sulfide in the first purified hydrogen sulfide fraction (32) is selected in order to obtain or achieve the desired target percentage or proportion of elemental sulfur in the sulfur product (26), which is preferably at least about 95% by volume of elemental sulfur.

In summary, the purities of both the hydrogen product (22) and the sulfur product (26) are dependent upon the purity of the first purified hydrogen sulfide fraction (32). Increasing the purity of the first purified hydrogen sulfide fraction (32) will permit or provide for an increase in the purities of the resulting hydrogen and sulfur products (22, 26). The purities of both the hydrogen and sulfur products (22, 26) are preferably maximized in order to maximize the value of the products (22, 26).

The first separating step may be comprised of any process, method or step or steps capable of, and suitable for, separating the hydrogen sulfide from the carbon dioxide and other contaminants in the feed gas (24). However, preferably, the first separating step is comprised of the step of passing the feed gas (24) through an amine based reagent (34) which is capable of selectively absorbing hydrogen sulfide so that the first purified hydrogen sulfide fraction (32) is absorbed by the amine based reagent (34). In addition, the first separating step is preferably further comprised of the step of regenerating the amine based reagent (34) from the first purified hydrogen sulfide fraction (32) to recover the amine based reagent (34) for recycling.

Any amine based reagent capable of selectively absorbing hydrogen sulfide may be used. "Selectively absorbing hydrogen sulfide" refers to the preferential absorption of hydrogen sulfide from the feed gas (24), while minimizing the absorption of any other components of or contaminants in the feed gas (24). Thus, in the preferred embodiment, the amine based reagent (34) is selected to absorb and remove as much of the hydrogen sulfide from the feed gas (24) as possible, while simultaneously absorbing and removing as little as possible of the other components of or contaminants in the feed gas (24), such as carbon dioxide. In the preferred embodiment, the selective absorption results in the absorption of the first purified hydrogen sulfide fraction (32).

In the preferred embodiment, the amine based reagent (34) is comprised of a Flexsorb™ amine based reagent. Flexsorb™ is a trade-mark of Exxon Corporation and refers to a group of solvents manufactured thereby by a proprietary process, including FLEXSORB SE™ and FLEXSORB SE PLUS™. The Flexsorb™ solvents are described by Exxon Corporation as aqueous solutions of a sterically hindered amine specifically tailored for high hydrogen sulfide capacity and selectivity.

The apparatus (20) of the invention is comprised of a first separating apparatus (36) for first separating the feed gas (24) to obtain the first purified hydrogen sulfide fraction (32). More particularly, the first separating apparatus (36) separates the feed gas (24) to obtain both the first purified hydrogen sulfide fraction (32) and the contaminant product (28) from the feed gas (24). Accordingly, the first separating apparatus (36) is used for performing the first separating step of the process.

The first separating apparatus (36) may be comprised of any apparatus, mechanism or device suitable for and capable of separating the feed gas (24) to obtain the first purified hydrogen sulfide fraction (32) comprised of a desired percentage or proportion of hydrogen sulfide by volume. However, in the preferred embodiment, the first separating apparatus (36) is comprised of one or more absorber vessels (38), which are also collectively referred to herein as the first absorber vessel (38). Thus, the first absorber vessel (38) may be comprised of a single absorber vessel for performing a single pass or multiple passes of the feed gas (24) therethrough. Alternatively, the first absorber vessel (38) may be comprised of a plurality of absorber vessels connected in series for performing a single pass or multiple passes of the feed gas (24) therethrough.

One or more of any conventional or known type or configuration of absorber vessel, or combinations of conventional or known types or configurations of absorber vessel, may comprise the first absorber vessel (38) which is suitable for and capable of selectively absorbing hydrogen sulfide so that the first purified hydrogen sulfide fraction (32) is absorbed in the first absorber vessel (38). Absorber vessels are also referred to in the industry as absorber towers, contactor towers, amine plants or towers or scrubbers and are typically used as a part of a gas sweetening system.

Further, the first separating apparatus (36) is preferably comprised of the amine based reagent (34), as described above, which is capable of selectively absorbing hydrogen sulfide. The amine based reagent (34) is contained within the first absorber vessel (38). The feed gas (24) is pressurized by the compressor (30) and then passes into the first absorber vessel (38) through an inlet (39) in the first absorber vessel (38) for the feed gas (24). The feed gas (24) enters the first absorber vessel (38) and rises through the descending amine based reagent (34), during which process the hydrogen sulfide is selectively absorbed by the amine based reagent (34). The carbon dioxide and other contaminants continue to rise within the first absorber vessel (38) and exit the first absorber vessel (38) through a contaminant outlet (40) to provide or form the contaminant product (28).

Preferably, the apparatus (20) is further comprised of a regenerator (42) for recovering the amine based reagent (34). Alternately, the regenerator (42) may comprise, or form a component of, the first separating apparatus (36). Any conventional or known type or configuration of regenerator (42) or other reagent regenerating or recovering device or apparatus may be used which is suitable for and capable of recovering the amine based reagent (34) from the first purified hydrogen sulfide fraction (32). Regenerators (42) are also referred to in the industry as regeneration still columns or towers or amine stripping stills and are used in conjunction with absorber vessels.

The regenerator (42) is in communication with the first separating apparatus (36) so that the first purified hydrogen sulfide fraction (32) absorbed in the amine based reagent (34) passes from the first separating apparatus (36) to the regenerator (42). The regenerator (42) then recovers the amine based reagent (34) from the first purified hydrogen sulfide fraction (32).

More particularly, in the preferred embodiment, the first absorber vessel (38) is comprised of an outlet (44) for the first purified hydrogen sulfide fraction (32) for passage of the first purified hydrogen sulfide fraction (32) absorbed in the amine based reagent (34) out of the first absorber vessel (38). The regenerator (42) is comprised of a regenerator inlet (46). The outlet (44) for the first purified hydrogen sulfide fraction (32) of the first absorber vessel (38) is in communication with the regenerator inlet (46) so that the first purified hydrogen sulfide fraction (32) absorbed in the amine based reagent (34) passes from the first absorber vessel (38) to the regenerator (42), preferably by gravity.

The regenerator (42) then recovers the amine based reagent (34) from the first purified hydrogen sulfide fraction (32). Preferably, the regenerator (42) is additionally comprised of a regenerator heat exchanger (49) for heating the contents of the regenerator (42). The regenerator heat exchanger (42) may be comprised of any apparatus, mechanism or device capable of, and suitable for, heating the contents of the regenerator (42), including the first purified hydrogen sulfide fraction (32), to a temperature sufficient to enhance the operation of the regenerator (42) and to facilitate or enhance the recovery of the amine based reagent (34).

The amine based reagent (34) is recovered to provide a cleaned or recovered amine based reagent (48). The cleaned or recovered amine based reagent (48) exits the regenerator (42) through an outlet (50) for the recovered amine based reagent (48) and is preferably recycled or circulated back to the first absorber vessel (38), and any further absorber vessels as described below, by a pump (55) or other pumping apparatus. In the preferred embodiment, at least a portion of the recovered amine based reagent (48) enters the first absorber vessel (38) through an inlet (52) for the recovered amine based reagent (48). Further, following the recovery of the amine based reagent (34) from the first purified hydrogen sulfide fraction (32), the first purified hydrogen sulfide fraction (32) passes or exits out of the regenerator (42) through an outlet (54) for the first purified hydrogen sulfide fraction (32).

Additionally, depending upon the efficacy of the regenerator (42) in the recovery of the amine based reagent (34), the apparatus (20) may be further comprised of at least one demister or other further recovery apparatus or device for recovering or removing any further or residual amine based reagent (34) which exits the regenerator (42) with the first purified hydrogen sulfide fraction (32). In the preferred embodiment, the apparatus (20) is comprised of a first demister (56). In particular, the outlet (54) of the regenerator (42) for the first purified hydrogen sulfide fraction (32) is in communication with the first demister (56). The first demister (56) removes or recovers any additional or residual amine based reagent (34) and any recovered amine based reagent (48) from the first demister (56) is preferably recycled to the regenerator (42).

Next, the process is comprised of the step of dissociating hydrogen sulfide present in the first purified hydrogen sulfide fraction (32). However, the first purified hydrogen sulfide fraction (32) at the start of the dissociating step preferably has a gauge pressure of about 30-60 psi or 1b/in$^2$ (about 206.85-413.70 kilopascals). It has been found that the gauge pressure of the first purified hydrogen sulfide fraction (32) following the regenerating step and passage through the first demister (56) is typically about 0-10 psi or 1b/in$^2$ (about 0-68.95 kilopascals). Thus, prior to the dissociating step, the pressure of the first purified hydrogen sulfide fraction (32) is preferably increased to a desired gauge pressure of about 30-60 psi or 1b/in$^2$ (about 206.85-413.70 kilopascals). Thus, the apparatus (20) is preferably comprised of a further compressor (60), which is also referred to herein as the second compressor (60), for pressurizing the first purified hydrogen sulfide fraction (32) to the desired gauge pressure. In this regard, any type or manner of second compressor (60) capable of pressurizing the first purified hydrogen sulfide fraction (32) to the desired gauge pressure may be used.

The dissociating step dissociates hydrogen sulfide present in the first purified hydrogen sulfide fraction (32) into elemental hydrogen and elemental sulfur to convert the first purified hydrogen sulfide fraction (32) into a dissociated first purified hydrogen sulfide fraction (58). Thus, the dissociated first purified hydrogen sulfide fraction (58) is comprised of elemental hydrogen and elemental sulfur. In addition, depending upon the efficacy or effectiveness of the dissociating step, the dissociated first purified hydrogen sulfide fraction (58) may be further comprised of hydrogen sulfide.

With respect to the apparatus (20), the apparatus (20) is further comprised of a dissociating apparatus (62) for dissociating the hydrogen sulfide present in the first purified hydrogen sulfide fraction (32) to provide the dissociated first purified hydrogen sulfide fraction (58). Preferably, the dissociating apparatus (62) is comprised of an apparatus, mechanism or device suitable for and capable of dissociating a substantial or significant portion or percentage of the hydrogen sulfide present in the first purified hydrogen sulfide fraction (32) into elemental hydrogen and elemental sulfur.

Thus, with respect to both the process and the apparatus (20), the resulting dissociated first purified hydrogen sulfide fraction (58) is comprised of elemental hydrogen, elemental sulfur and hydrogen sulfide. Preferably, the dissociated first purified hydrogen sulfide fraction (58) is comprised of a substantial or significant proportion or percentage by volume of elemental hydrogen and elemental sulfur relative to the proportion or percentage of undissociated hydrogen sulfide. More particularly, the dissociated first purified hydrogen sulfide fraction (58) is preferably comprised of a relatively small or minimal amount of hydrogen sulfide by volume. However, the relative proportion of hydrogen sulfide in the dissociated first purified hydrogen sulfide fraction (58) will be dependent upon, amongst other factors, the temperature at which the dissociating step is conducted as discussed below.

In the preferred embodiment of the process, the dissociating step is performed by thermal decomposition of the first purified hydrogen sulfide fraction (32), which may also be referred to as thermal degradation. Further, the hydrogen sulfide present in the first purified hydrogen sulfide fraction (32) is preferably thermally decomposed or degraded under plasma conditions. Thus, the dissociating step is preferably performed in a plasma reactor (64).

Similarly, the dissociating apparatus (62) is preferably comprised of a reactor capable of dissociating hydrogen sulfide by thermal decomposition or degradation, preferably under plasma conditions. Accordingly, the dissociating apparatus (62) is preferably comprised of a plasma reactor. (64).

With respect to both the process and the apparatus (20), any type or configuration of plasma reactor (64) capable of performing the dissociating step may be used. However, the plasma reactor (64) is preferably a microwave driven plasma reactor, i.e., the plasma reactor (64) is driven by microwave energy. More particularly, in the preferred embodiment, the microwave driven plasma reactor (64) is preferably of the type described in Canadian Patent No. 2,221,624 issued Feb. 12, 2002 to Physical Sciences, Inc. and U.S. Pat. No. 5,793,013 issued Aug. 11, 1998 to Read et. al., which may be referred to as the Physical Sciences, Inc. microwave plasma torch. The use of the Physical Sciences, Inc. microwave plasma torch is preferred as it has been found to produce a relatively stable plasma and to inhibit or lessen any potential contamination or combustion of the gases therein.

Where desired, helium or an alternate gas may be used for start-up or priming of the plasma reactor (64) or for testing the integrity of the plasma reactor (64) prior to directing any hydrogen sulfide containing gas therein. The first purified hydrogen sulfide fraction (32) is then directed into the plasma reactor (64) through a reactor inlet (66). Thus, the reactor inlet (66) is in communication, either directly or indirectly, with the outlet (54) of the regenerator (42) so that the first purified hydrogen sulfide fraction (32) passes from the regenerator (42) to the dissociating apparatus (62), and particularly to the plasma reactor (64). In the preferred embodiment, the reactor inlet (66) communicates indirectly with the outlet (54) of the regenerator (42) via the first demister (56) and the second compressor (60).

The reactor inlet (66) may be comprised of one or more inlet nozzles (not shown), as desired, which direct the first purified hydrogen sulfide fraction (32) into a reactor chamber (68). The inlet nozzles are directed into the reactor chamber (68) and configured in a manner creating a velocity and a swirl in the reactor chamber (68) adequate to stabilize the plasma therein. The reactor chamber (68) is provided for containing or confining the high temperature plasma and is coupled with a microwave power source such that the gases are ionized within the reactor chamber (68). Thus, within the reactor chamber (68), the first purified hydrogen sulfide fraction (32) contacts the high temperature plasma to dissociate the hydrogen sulfide. Specifically, the first purified hydrogen sulfide fraction (32) passes through the plasma causing the chemical bond between the hydrogen and the sulfur to be broken by the process of thermal degradation. The dissociated first purified hydrogen sulfide fraction (58) then passes out of a reactor outlet (70) of the plasma reactor (64) for further processing.

The dissociating step may be performed at any temperature and at any pressure suitable for dissociating hydrogen sulfide present in the first purified hydrogen sulfide fraction (32) by thermal decomposition. However, the proportion or percentage of hydrogen sulfide which is dissociated by the dissociating step is believed to be dependent upon the temperature at which the dissociating step is conducted. More particularly, theoretical thermodynamic calculations have been performed to provide theoretical dissociation curves representing the chemical constituents of the dissociated first purified hydrogen sulfide fraction (58), including the percentage of hydrogen sulfide, elemental hydrogen and elemental sulfur, as a function of temperature.

With respect to the percentage of hydrogen sulfide, the theoretical dissociation curve shows a steep slope from 0 degrees Celsius to about 2000 degrees Celsius. Specifically, at a temperature of about 500 degrees Celsius, the dissociated first purified hydrogen sulfide fraction (58) is comprised of greater than about 90% hydrogen sulfide by volume. At a temperature of about 1000 degrees Celsius, the dissociated first purified hydrogen sulfide fraction (58) is comprised of about 60%-70% hydrogen sulfide by volume. At a temperature of about 1500 degrees Celsius, the dissociated first purified hydrogen sulfide fraction (58) is comprised of about 10-20% hydrogen sulfide by volume. At a temperature of about 2000 degrees Celsius, the dissociated first purified hydrogen sulfide fraction (58) is comprised of a minimal amount of hydrogen sulfide, such as less than about 5% hydrogen sulfide by volume. At temperatures greater than about 2000 degrees Celsius, the dissociation curve levels off such that further increases in temperature have a minimal effect on the level of dissociation.

Preferably, the dissociated first purified hydrogen sulfide fraction (58) is comprised of a greater portion or percentage of elemental hydrogen and sulfur than hydrogen sulfide. More preferably, the proportion or percentage of hydrogen sulfide comprising the dissociated first purified hydrogen sulfide fraction (58) is minimized or reduced as much as reasonably practicable given the operating conditions and limitations of the dissociating apparatus (62).

Based upon the theoretical dissociation curve, temperatures of less than about 1500 degrees Celsius do not allow for an optimum level of dissociation into elemental hydrogen and sulfur. Further, temperatures of greater than about 2000 degrees Celsius provide a minimal increase in the level of dissociation, while requiring a greater amount of energy input to generate the required temperature. Therefore, in order to maximize the energy efficiency of the dissociating step while still achieving desirable levels of dissociation, the dissociating step is preferably performed at a temperature of between about 1500 degrees Celsius and about 2000 degrees Celsius. In other words, the dissociating step is performed at a temperature of between 1500 and 2000 degrees Celsius, which is intended to include a temperature which is between about or approximately the values indicated.

Actual testing conducted with respect to the percentage of dissociation tended to show a lower level of dissociation of the hydrogen sulfide than theorized by the theoretical dissociation curve discussed above. It is believed that these lower levels may be a result of recombination of the elemental hydrogen and elemental sulfur into hydrogen sulfide either within the plasma reactor (64) or downstream thereof. In order to address any potential recombination of the hydrogen sulfide, the elemental hydrogen and elemental sulfur are preferably physically separated following the dissociating step, as discussed further below. Further, any recombination may be further deterred or prevented by cooling the dissociated first purified hydrogen sulfide fraction (58), as discussed further below. Cooling of the dissociated first purified hydrogen sulfide fraction (58) is believed to enhance or facilitate the condensing of the gaseous sulfur into its liquid form for removal as the sulfur product (26), as well as inhibit the chemical reaction of the hydrogen with the sulfur to re-form hydrogen sulfide.

Further, the dissociating step is performed at a pressure compatible with the operating parameters of the plasma reactor (64). For instance, the dissociating step may be performed at a broad range of gauge pressures from less than about 10 kilopascals (about 1.45 psi) to greater than about 1000 kilopascals (145 psi). Preferably, the dissociating step is performed at a gauge pressure of about 6 kilopascals (about 0.87 psi) to about 1000 kilopascals (145 psi). In the preferred embodiment, the dissociating step is performed at a gauge pressure of between about 200 kilopascals (about 29 psi) and about 500 kilopascals (about 72.5 psi). In other words, the dissociating step is performed at a gauge pressure of between 200 kilopascals (about 29 psi) and 500 kilopascals (about 72.5 psi), which is intended to include a gauge pressure which is between about or approximately the values indicated.

The process is further comprised of a second separating step following the dissociating step. Specifically, the second separating step separates the dissociated first purified hydrogen sulfide fraction (58) to obtain a hydrogen rich fraction (72) comprised of elemental hydrogen. The hydrogen rich fraction (72) may be comprised of any proportion or percentage of elemental hydrogen. However, the hydrogen rich fraction (72) is preferably relatively "rich" such that it is comprised of a significant proportion or percentage of elemental hydrogen. In the preferred embodiment, the percentage of elemental hydrogen in the hydrogen rich fraction (72) is maximized as much as reasonably practicable, while minimizing or reducing any contaminants or other components in the hydrogen rich fraction (72).

Where the hydrogen rich fraction (72) is substantially or essentially comprised of elemental hydrogen, the hydrogen rich fraction (72) may comprise the hydrogen product (22). In other words, the hydrogen product (22) may be obtained by simply collecting the hydrogen rich fraction (72), wherein the hydrogen product (22) is comprised of the hydrogen rich fraction (72). Where the hydrogen rich fraction (72) is not substantially or essentially comprised of elemental hydrogen, the hydrogen rich fraction (72) may still comprise the hydrogen product (22) in instances in which the use of the hydrogen product (22) is tolerant of an amount of hydrogen sulfide therein. However, typically, the hydrogen rich fraction (72) is further comprised of a proportion or percentage of hydrogen sulfide requiring further processing as discussed below. Thus, in the preferred embodiment, the process is further comprised of the step of obtaining the hydrogen product (22) from the hydrogen rich fraction (72).

In addition, where the sulfur product (26) is desirable, the process is also preferably comprised of the step of obtaining the sulfur product (26) from the dissociated first purified hydrogen sulfide fraction (58). Thus, the second separating step is performed to separate the dissociated first purified hydrogen sulfide fraction (58) to obtain or provide the hydrogen rich fraction (72) comprised of elemental hydrogen and to obtain or provide the sulfur product (26) comprised of elemental sulfur.

Finally, as indicated, the dissociated first purified hydrogen sulfide fraction (58) may be further comprised of a proportion or percentage of hydrogen sulfide which is not dissociated during the dissociating step. In this instance, the second separating step may possibly be further comprised of obtaining a second purified hydrogen sulfide fraction (74) from the dissociated first purified hydrogen sulfide fraction (58), wherein the second purified hydrogen sulfide fraction (74) is comprised of hydrogen sulfide. The second purified hydrogen sulfide fraction (74) may be comprised of any proportion or percentage of hydrogen sulfide. However preferably, the second purified hydrogen sulfide fraction (74) is relatively "rich" such that it is comprised of a significant proportion or percentage of hydrogen sulfide by volume. In other words, the percentage of hydrogen sulfide by volume is preferably maximized, while minimizing, and preferably eliminating, any contaminants or other components in the second purified hydrogen sulfide fraction (74). Thus, in the preferred embodiment, the second purified hydrogen sulfide fraction (74) is as pure as reasonably practicable, being comprised of as high a percentage of hydrogen sulfide by volume as is reasonably practicable.

Accordingly, in the preferred embodiment, the second separating step separates the dissociated first purified hydrogen sulfide fraction (58) into three components or streams to obtain the hydrogen rich fraction (72), the sulfur product (26) and the second purified hydrogen sulfide fraction (74). The second separating step may be performed in any manner capable of separating these three components or streams, such as by centrifugally separating the dissociated first purified hydrogen sulfide fraction (58), by gravitationally separating the dissociated first purified hydrogen sulfide fraction (58) or by a combination thereof.

With respect to the apparatus (20), the apparatus (20) is preferably further comprised of a second separating apparatus (76) for second separating the dissociated first purified hydrogen sulfide fraction (58) as described above. The second separating apparatus (76) communicates either directly or indirectly with the dissociating apparatus (62). Specifically, the second separating apparatus (76) is comprised of a second separating apparatus inlet (78) which permits the passage of the dissociated first purified hydrogen sulfide fraction (58) therethrough. Thus, the reactor outlet (70) communicates with the second separating apparatus inlet (78) to permit the dissociated first purified hydrogen sulfide fraction (58) to pass from the dissociating apparatus (62) to the second separating apparatus (76).

Further, the second separating apparatus (76) is comprised of a plurality of outlets to permit the passage of the various components or streams, as described above, to pass out of the second separating apparatus (76) following the separation of the dissociated first purified hydrogen sulfide fraction (58) therein. First, the second separating apparatus (76) is preferably comprised of an outlet (80) for the hydrogen rich fraction (72) to permit the passage of the hydrogen rich fraction (72) out of the second separating apparatus (76) following its separation from the dissociated first purified hydrogen sulfide fraction (58).

Second, the second separating apparatus (76) is preferably further comprised of a sulfur collector (82) for collecting the sulfur product (26) following its separation from the dissociated first purified hydrogen sulfide fraction (58). Specifically, the sulfur collector (82) obtains the sulfur product (26) from the dissociated first purified hydrogen sulfide fraction (58). Thus, the sulfur collector (82) may be comprised of any apparatus, mechanism or device capable of, and suitable for, collecting the sulfur product (26) following its separation from the dissociated first purified hydrogen sulfide fraction (58). In the preferred embodiment, the sulfur product (26) condenses in the second separating apparatus (76) and flows in a liquid form into the sulfur collector (82) at the bottom of the second separating apparatus (76).

In addition, the sulfur collector (82) is comprised of a sulfur outlet (84) to permit the passage of the sulfur product (26) out of the sulfur collector (82), and thus out of the second separating apparatus (76). Specifically, the liquid sulfur product (26) is permitted to gravitationally flow out of the sulfur outlet (84). The sulfur product (26) is either collected and stored in its liquid form or it may be converted to blocks or pellets and stored in solid form.

Third, the second separating apparatus (76) is preferably further comprised of a separator (86) for obtaining the second purified hydrogen sulfide fraction (74) from the dissociated first purified hydrogen sulfide fraction (58). The separator (86) separates the dissociated first purified hydrogen sulfide fraction (58) to obtain the second purified hydrogen sulfide fraction (74). Preferably, the separator (86) is comprised of a centrifugal or gravitational separator. In addition, the second separating apparatus (76), and specifically the separator (86), is further comprised of an outlet (88) for the second purified hydrogen sulfide fraction (74). Thus, the second purified hydrogen sulfide fraction (74) is permitted to pass out of the second separating apparatus (76) following its separation from the dissociated first purified hydrogen sulfide fraction (58).

In order to enhance the efficiency of the process and apparatus (20), the second purified hydrogen sulfide fraction (74) is preferably recycled such that it may further undergo or be re-subjected to the dissociating step. As a result, the second purified hydrogen sulfide fraction (74) is dissociated or thermally decomposed to recover further elemental hydrogen and elemental sulfur therefrom. In other words, in the event an amount of hydrogen sulfide in the first purified hydrogen sulfide fraction (32) is not initially dissociated by the dissociating step, this hydrogen sulfide is returned or recycled back or upstream of the dissociating step as the second purified hydrogen sulfide fraction (74) for further dissociation of the hydrogen sulfide therein.

The second purified hydrogen sulfide fraction (74) may be recycled or circulated back or upstream in any manner and to any appropriate point or step in the process prior to the dissociating step. However, preferably, the process further comprises the step of combining the second purified hydrogen sulfide fraction (74) with the first purified hydrogen sulfide fraction (32). Thus, the dissociating step is conducted to dissociate the hydrogen sulfide present in the combined first and second purified hydrogen sulfide fractions (32, 74).

Accordingly, in the preferred embodiment of the apparatus (20), the outlet (88) for the second purified hydrogen sulfide fraction (74) is in communication, either directly or indirectly, with the dissociating apparatus (62) so that the second purified hydrogen sulfide fraction (74) may be dissociated by the dissociating apparatus (62). In particular, the second purified hydrogen sulfide fraction (74) preferably combines with the first purified hydrogen sulfide fraction (32) following the passage of the first purified hydrogen sulfide fraction (32) out of the first demister (56) and prior to its passage into the second compressor (60).

As discussed above, there is believed to be a tendency for the elemental hydrogen and the elemental sulfur to recombine following the dissociating step to re-form hydrogen sulfide. Physical separation of the elemental hydrogen and elemental sulfur by the second separating step may deter, and preferably prevent, this recombination. This tendency to recombine may be further deterred or prevented by cooling the dissociated first purified hydrogen sulfide fraction (58) to enhance or facilitate the condensing of the gaseous sulfur into its liquid form for removal as the sulfur product (26) and to inhibit the chemical reaction of the hydrogen with the sulfur to re-form hydrogen sulfide.

As a result, the process is preferably further comprised of the step of cooling the dissociated first purified hydrogen sulfide fraction (58) following the dissociating step in order to inhibit recombination of the elemental hydrogen and the elemental sulfur. The cooling step is preferably performed rapidly or immediately following the dissociating step in order to inhibit or prevent any substantial recombination of the elemental hydrogen and elemental sulfur. Such rapid cooling of the dissociated first purified hydrogen sulfide fraction (58), in combination with the physical removal or separation of the elemental sulfur from the elemental hydrogen, is believed to limit or reduce any recombination of the elemental hydrogen and sulfur.

The cooling step may be performed at any temperature sufficient to inhibit any substantial recombination of the elemental hydrogen and sulfur. Thus, the dissociated first purified hydrogen sulfide fraction (58) is preferably cooled to a temperature at which the elemental hydrogen and the elemental sulfur are not reactive or not readily reactive. In this regard, the cooling step is preferably comprised of cooling the dissociated first purified hydrogen sulfide fraction (58) to a temperature less than about the boiling point of the elemental sulfur, being about 717.9 K (about 445 degrees Celsius) at atmospheric pressure (or 0 gauge pressure). Accordingly, in the preferred embodiment, the cooling step is comprised of cooling the dissociated first purified hydrogen sulfide fraction (58) to a temperature of less than about 445 degrees Celsius at atmospheric pressure.

To perform the cooling step, the second separating apparatus (76) is further preferably comprised of a second separating apparatus heat exchanger (90) for cooling the dissociated first purified hydrogen sulfide fraction (58). In order to permit rapid or immediate cooling of the dissociated first purified hydrogen sulfide fraction (58), the second separating apparatus (76) comprised of the second separating apparatus heat exchanger (90) is preferably in proximate or direct communication with the dissociating apparatus (62). In particular, the second separating apparatus heat exchanger (90) is contained or housed within the second separating apparatus (76). Accordingly, the second separating apparatus heat exchanger (90) is capable of rapidly or immediately cooling the dissociated first purified hydrogen sulfide fraction (58) as it enters the second separator apparatus inlet (78) from the reactor outlet (70). The second separating apparatus heat exchanger (90) may be comprised of any mechanism or device capable of cooling the dissociated first purified hydrogen sulfide fraction (58) to the desired temperature.

As described above, the regenerator (42) is comprised of the regenerator heat exchanger (49) for heating the first purified hydrogen sulfide fraction (32) and any other contents of the regenerator (42). The second separating apparatus (76) is comprised of the second separating apparatus heat exchanger (90) for cooling the dissociated first purified hydrogen sulfide fraction (58) in the second separating apparatus (76). In order to improve the energy efficiency of the process and apparatus (20), the regenerator heat exchanger (49) and the second separating apparatus heat exchanger (90) are associated in a manner such that heat from within the second separating apparatus (76) is transferred to the regenerator (42). The regenerator heat exchanger (49) and the second separating apparatus heat exchanger (90) are preferably associated in a manner permitting the reasonably effective transfer of heat therebetween.

In the preferred embodiment, a circulation system (92) is provided which is comprised of the regenerator heat exchanger (49), the second separating apparatus heat exchanger (90) and a pump (94) for circulating or pumping water, or another suitable fluid capable of transferring heat, about the circulation system (92). Specifically, as the dissociated first purified hydrogen sulfide fraction (58) cools within the second separating apparatus (76), heat is transferred to the water circulating through the second separating apparatus heat exchanger (90), resulting in a heated water (96). The heated water (96) is then circulated through the circulation system (92) to the regenerator heat exchanger (49). Within the regenerator (42), the heat is transferred from the heated water (96) circulating through the regenerator heat exchanger (49) into the first purified hydrogen sulfide fraction (32) and other contents within the regenerator (42), resulting in a cooled water (98). The cooled water (98) is the circulated back through the circulation system (92) to the second separating apparatus heat exchanger (90) to repeat the cycle.

Following the second separating step, the process is comprised of the step of obtaining the hydrogen product (22) from the hydrogen rich fraction (72). As discussed above, the hydrogen rich fraction (72) is comprised of elemental hydrogen and may be further comprised of hydrogen sulfide. As a result, the hydrogen product (22) obtaining step is preferably comprised of a step of third separating the hydrogen rich fraction (72) to obtain the hydrogen product (22) from the hydrogen rich fraction (72).

The third separating step separates the hydrogen rich fraction (72) to obtain the hydrogen product (22). The third separating step may be comprised of any process, method or step or steps capable of, and suitable for, separating the hydrogen rich fraction (72) to obtain the desired hydrogen product (22). The third separating step separates the elemental hydrogen from any other components of the hydrogen rich fraction (72), such as any hydrogen sulfide therein, to provide the hydrogen product (22).

Preferably, the third separating step is comprised of the step of passing the hydrogen rich fraction (72) through an amine based reagent (34) which is capable of selectively absorbing hydrogen sulfide to obtain a third purified hydrogen sulfide fraction (100), wherein the third purified hydrogen sulfide fraction (100) is comprised of hydrogen sulfide and wherein the third purified hydrogen sulfide fraction (100) is absorbed by the amine based reagent (34). In addition, the third separating step is preferably comprised of the step of regenerating the amine based reagent (34) from the third purified hydrogen sulfide fraction (100) to recover the amine based reagent (34) for recycling.

The third purified hydrogen sulfide fraction (100) may be comprised of any proportion or percentage of hydrogen sulfide. However preferably, the third purified hydrogen sulfide fraction (100) is relatively "rich" such that it is comprised of a significant proportion or percentage of hydrogen sulfide by volume. In other words, the percentage of hydrogen sulfide by volume is preferably maximized, while minimizing, and preferably eliminating, any contaminants or other components in the third purified hydrogen sulfide fraction (100). Thus, in the preferred embodiment, the third purified hydrogen sulfide fraction (100) is as pure as reasonably practicable, being comprised of as high a percentage of hydrogen sulfide by volume as is reasonably practicable.

Thus, the step of passing the hydrogen rich fraction (72) through the amine based reagent (34) to selectively absorb hydrogen sulfide results in the obtaining of the third purified hydrogen sulfide fraction (100), as well as the obtaining of the hydrogen product (22). In other words, any remaining hydrogen sulfide in the hydrogen rich fraction (72) is preferably removed, which results in or provides the hydrogen product (22).

As with the first separating step, any amine based reagent (34) capable of selectively absorbing hydrogen sulfide may be used for the third separating step. "Selectively absorbing hydrogen sulfide" with reference to the third separating step is defined in the same manner as above in relation to the first separating step and thus has the same meaning. Specifically, "selectively absorbing hydrogen sulfur" in this step refers to the preferential absorption of hydrogen sulfide from the hydrogen rich fraction (72), while minimizing the absorption of any other components of the hydrogen rich fraction including elemental hydrogen. Thus, in the preferred embodiment, the amine based reagent (34) is selected to absorb and remove as much of the hydrogen sulfide from the hydrogen rich fraction (72) as possible, while simultaneously absorbing and removing as little as possible of the other components of the hydrogen rich fraction (72), particularly elemental hydrogen. In the preferred embodiment, the selective absorption results in the absorption of the third purified hydrogen sulfide fraction (100).

As stated, any amine based reagent (34) capable of "selectively absorbing hydrogen sulfide" may be used, wherein the hydrogen sulfide is absorbed while minimizing the absorption of any other components of the hydrogen rich fraction. For instance, as with the first separating step, the amine based reagent (34) may be comprised of monoethanolamine (MEA), diethanolamine (DEA), diglycolamine (DGA), diisopropanolamine (DIPA), methyldiethanolamine (MDEA), triethanolamine (TEA), UCARSOL™, SELEXOL™ and mixtures thereof In the preferred embodiment, the amine based reagent (34) is comprised of a Flexsorb™ amine based reagent.

In addition, in the preferred embodiment, the process further comprises the step of combining the third purified hydrogen sulfide fraction (100) with the first purified hydrogen sulfide fraction (32). Thus, the dissociating step, as described above, is conducted to dissociate the hydrogen sulfide present in both the first purified hydrogen sulfide fraction (32) and the third purified hydrogen sulfide fraction (100). In other words, in the event an amount of hydrogen sulfide remains in the hydrogen rich fraction (72), this hydrogen sulfide is returned or recycled back or upstream of the dissociating step as the third purified hydrogen sulfide fraction (100) for further dissociation of the hydrogen sulfide.

As indicated, the amine based reagent (34) is preferably regenerated and recovered from the third purified hydrogen sulfide fraction (100), as well as from the first purified hydrogen sulfide fraction (32). Thus, in the preferred embodiment, the process further comprises the step of regenerating the amine based reagent (34) from the first purified hydrogen sulfide fraction (32) and the third hydrogen sulfide fraction (100) to recover the amine based reagent (34) from the first and third purified hydrogen sulfide fractions (32, 100) respectively. As a result, the first and third purified hydrogen sulfide fractions (32, 100) with the absorbed amine based reagent (34) are preferably combined and a single regenerating step is performed to recover the amine based reagent (34) therefrom.

Thus, the apparatus (20) of the invention is preferably further comprised of a third separating apparatus (102) for third separating the hydrogen rich fraction (72) to obtain the hydrogen product (22). More particularly, the third separating apparatus (102) separates the hydrogen rich fraction (72) to obtain both the third purified hydrogen sulfide fraction (100) and the hydrogen product (22). Accordingly, the third separating apparatus (102) is used for performing the third separating step of the process.

The third separating apparatus (102) may be comprised of any apparatus, mechanism or device suitable for and capable of separating the hydrogen rich fraction (72) to obtain the desired hydrogen product (22). However, in the preferred embodiment of the apparatus (20), the third separating apparatus (102) is comprised of one or more absorber vessels (104), which are also collectively referred to herein as the second absorber vessel (104). Thus, the second absorber vessel (104) may be comprised of a single absorber vessel for performing a single pass or multiple passes of the hydrogen rich fraction (72) therethrough. Alternatively, the second absorber vessel (104) may be comprised of a plurality of absorber vessels connected in series for performing a single pass or multiple passes of the hydrogen rich fraction (72) therethrough.

One or more of any conventional or known type or configuration of absorber vessel, or combinations of conventional or known types or configurations of absorber vessel, may comprise the second absorber vessel (104) which is suitable for and capable of selectively absorbing hydrogen sulfide so that the third purified hydrogen sulfide fraction (102) is absorbed in the second absorber vessel (104). Further, the third separating apparatus (102) is preferably comprised of the amine based reagent (34), as described above, which is capable of selectively absorbing hydrogen sulfide so that the third purified hydrogen sulfide fraction (100) is absorbed by the amine based reagent (34). The amine based reagent (34) is contained within the second absorber vessel (104).

The second absorber vessel (104) is comprised of a second absorber vessel inlet (106) for passage of the hydrogen rich fraction (72) into the second absorber vessel (104). The hydrogen rich fraction (72) may be at any pressure compatible with the third separating step and the second absorber vessel (104) upon entry therein. However, in the preferred embodiment, the gauge pressure of the hydrogen rich fraction (72) entering the second absorber vessel (104) is preferably about 10-15 psi or $1b/in^2$ (about 68.95-103.425 kilopascals). Thus, where necessary to achieve the desired pressure, a further compressor (not shown), similar to compressor (30), may be provided for pressurizing the hydrogen rich fraction (72).

The hydrogen rich fraction (72) thus passes into the second absorber vessel (104) containing the amine based reagent (34). The hydrogen rich fraction (72) enters the second absorber vessel (104) and rises through the descending amine based reagent (34), during which process the hydrogen sulfide is selectively absorbed by the amine based reagent (34). The elemental hydrogen, and any other components, continue to rise within the second absorber vessel (104) and exit the second absorber vessel (104) through a second absorber vessel outlet (108) to provide or form the hydrogen product (22).

Further, as discussed previously, the apparatus (20) is preferably further comprised of the regenerator (42) for recovering the amine based reagent (34). Specifically, the regenerator (42) is preferably provided for recovering the amine based reagent (34) from both the first and third purified hydrogen sulfide fractions (32, 100). However, if desired, a separate or independent regenerator may be provided for recovering the amine based reagent (34) from each of the first purified hydrogen sulfide fraction (32) and the third purified hydrogen sulfide fraction (100).

Any conventional or known type or configuration of regenerator (42) may be used which is suitable for and capable of recovering the amine based reagent (34) from both the first and third purified hydrogen sulfide fractions (32, 100). Where a single regenerator (42) is provided, the regenerator (42) is preferably in communication with each of the first separating apparatus (36), the third separating apparatus (102) and the dissociating apparatus (62) so that the first purified hydrogen sulfide fraction (32) and the third purified hydrogen sulfide fraction (100) pass from the first and third separating apparatuses (36, 102) respectively to the regenerator (42) and from the regenerator (42) to the dissociating apparatus (62).

More particularly, in the preferred embodiment, the second absorber vessel (104) is comprised of an outlet (104) for the third purified hydrogen sulfide fraction (100) for passage of the third purified hydrogen sulfide fraction (100) absorbed in the amine based reagent (34) out of the second absorber vessel (104). The outlet (110) for the third purified hydrogen sulfide fraction (100) of the second absorber vessel (104) is in communication with the regenerator inlet (46) so that the third purified hydrogen sulfide fraction (100) absorbed in the amine based reagent (34) passes from the second absorber vessel (104) to the regenerator (42), preferably by gravity.

The regenerator (42) then recovers the amine based reagent (34) from the first and third purified hydrogen sulfide fractions (32, 100). Specifically, the amine based reagent (34) is recovered to provide the cleaned or recovered amine based reagent (48), as discussed previously. The cleaned or recovered amine based reagent (48) exits the regenerator (42) through the outlet (50) for the recovered amine based reagent (48) and is preferably pumped back, or recycled, to both the first absorber vessel (38) and the second absorber vessel (104).

With respect to the second absorber vessel (104), the recovered amine based reagent (48) enters the second absorber vessel (104) through an inlet (112) for the recovered amine based reagent (48). Further, following the recovery of the amine based reagent (34) in the regenerator (42), the third purified hydrogen sulfide fraction (100) combines with the first purified hydrogen sulfide fraction (32). In essence, the third purified hydrogen sulfide fraction (100) becomes or forms a part of the first purified hydrogen sulfide fraction (32) and passes or exits out of the regenerator (42) through the outlet (54) for the first purified hydrogen sulfide fraction (32).

Additionally, the apparatus (20) may be further comprised of at least one demister or other recovery apparatus or device for recovering or removing any residual amine based reagent (34) which exits the second absorber vessel (104) with the hydrogen product (22). Thus, in the preferred embodiment, the apparatus (20) is comprised of a second demister (114). In particular, the outlet (110) for the third purified hydrogen sulfide fraction (100) of the second absorber vessel (104) is in communication with the second demister (114). The second demister (114) removes or recovers any additional or residual amine based reagent (34) and any recovered amine based reagent (48) from the second demister (114) is preferably recycled to the regenerator (42). As a result, a relatively pure hydrogen product (22) passes out of the second demister (114).

Finally, the process is preferably further comprised of the step of delivering the hydrogen product (22) to a fuel cell (116) in order to produce electrical energy (118) from the hydrogen product (22). Accordingly, the apparatus (20) is preferably further comprised of the fuel cell (116) for producing electrical energy (118) from the hydrogen product (22).

The fuel cell (116) may be any type of hydrogen engine capable of producing electrical energy (118) from the hydrogen product (22). The electrical energy (118) produced by the fuel cell (116) is preferably utilized to power all or a portion of the process or the apparatus (20) or to supplement a further electrical energy source (120) or power grid in order to improve the energy efficiency of the process or the apparatus (20). Production of the electrical energy (118) also results in the production of water (122).

In the preferred embodiment, the process is further comprised of the step of using the electrical energy (118) produced by the fuel cell (116) in the dissociating step. Thus, in the preferred embodiment of the apparatus (20), the fuel cell (116) is electrically connected with the dissociating apparatus (62) so that the electrical energy (118) produced by the fuel cell (116) may be used to supply at least a portion of the power required by the dissociating apparatus (62), and particularly by the plasma reactor (64).

The embodiments of the invention in which an exclusive property or privilege is claimed are defined as follows:

1. A process for obtaining a hydrogen product from a feed gas consisting essentially of an acid gas, comprised of hydrogen sulfide, comprising the following steps:
   (a) first separating the feed gas to obtain a first purified hydrogen sulfide fraction from the feed gas, wherein the first purified hydrogen sulfide fraction is comprised of at least about 90 percent hydrogen sulfide by volume;
   (b) dissociating hydrogen sulfide present in the first purified hydrogen sulfide fraction into elemental hydrogen and elemental sulfur to convert the first purified hydrogen sulfide fraction into a dissociated first purified hydrogen sulfide fraction, wherein the dissociated first purified hydrogen sulfide fraction is comprised of elemental hydrogen and elemental sulfur;
   (c) second separating the dissociated first purified hydrogen sulfide fraction to obtain a hydrogen rich fraction from the dissociated first purified hydrogen sulfide fraction, wherein the hydrogen rich fraction is comprised of elemental hydrogen; and
   (d) obtaining the hydrogen product from the hydrogen rich fraction, wherein the hydrogen product is comprised of elemental hydrogen.

2. The process as claimed in claim 1 wherein the dissociating step is comprised of dissociating hydrogen sulfide present in the first purified hydrogen sulfide fraction by thermal decomposition.

3. The process as claimed in claim 2 wherein the dissociating step is performed at a temperature of between about 1500 degrees Celsius and about 2000 degrees Celsius.

4. The process as claimed in claim 3 wherein the dissociating step is performed at a pressure of between about 200 kilopascals and about 500 kilopascals.

5. The process as claimed in claim 1 wherein the dissociating step is comprised of dissociating hydrogen sulfide present in the first purified hydrogen sulfide fraction by thermal decomposition under plasma conditions.

6. The process as claimed in claim 5 wherein the dissociating step is performed at a temperature of between about 1500 degrees Celsius and about 2000 degrees Celsius.

7. The process as claimed in claim 6 wherein the dissociating step is performed at a pressure of between about 200 kilopascals and about 500 kilopascals.

8. The process as claimed in claim 1 wherein the dissociating step is performed in a plasma reactor.

9. The process as claimed in claim 8 wherein the plasma reactor is driven by electromagnetic energy.

10. The process as claimed in claim 9 wherein the electromagnetic energy is comprised of microwave energy.

11. The process as claimed in claim 10 wherein the dissociating step is performed at a temperature of between about 1500 degrees Celsius and about 2000 degrees Celsius.

12. The process as claimed in claim 11 wherein the dissociating step is performed at a pressure of between about 200 kilopascals and about 500 kilopascals.

13. The process as claimed in claim 1 wherein the first separating step is comprised of the step of passing the feed gas through an amine based reagent which is capable of selectively absorbing hydrogen sulfide so that the first purified hydrogen sulfide fraction is absorbed by the amine based reagent.

14. The process as claimed in claim 13 wherein the amine based reagent is comprised of an aqueous solution of a sterically hindered amine.

15. The process as claimed in claim 13 wherein the first separating step is further comprised of the step of regenerating the amine based reagent from the first purified hydrogen sulfide fraction to recover the amine based reagent from the first purified hydrogen sulfide fraction.

16. The process as claimed in claim 1 wherein the hydrogen rich fraction is further comprised of hydrogen sulfide and wherein the hydrogen product obtaining step is comprised of the step of third separating the hydrogen rich fraction to obtain the hydrogen product from the hydrogen rich fraction.

17. The process as claimed in claim 16 wherein the third separating step is comprised of the step of passing the hydrogen rich fraction through an amine based reagent which is capable of selectively absorbing hydrogen sulfide to obtain a third purified hydrogen sulfide fraction, wherein the third purified hydrogen sulfide fraction is comprised of hydrogen sulfide and wherein the third purified hydrogen sulfide fraction is absorbed by the amine based reagent.

18. The process as claimed in claim 17 wherein the amine based reagent is comprised of an aqueous solution of a sterically hindered amine.

19. The process as claimed in claim 17 wherein the third separating step is further comprised of the step of regenerating the amine based reagent from the third purified hydrogen sulfide fraction to recover the amine based reagent from the third purified hydrogen sulfide fraction.

20. The process as claimed in claim 19, further comprising the step of combining the third purified hydrogen sulfide fraction with the first purified hydrogen sulfide fraction.

21. The process as claimed in claim 17 wherein the first separating step is comprised of the step of passing the feed gas through an amine based reagent which is capable of selectively absorbing hydrogen sulfide so that the first purified hydrogen sulfide fraction is absorbed by the amine based reagent.

22. The process as claimed in claim 21 wherein the amine based reagent is comprised of an aqueous solution of a sterically hindered amine.

23. The process as claimed in claim 21, further comprising the step of combining the third purified hydrogen sulfide fraction with the first purified hydrogen sulfide fraction.

24. The process as claimed in claim 23, further comprising the step of regenerating the amine based reagent from the first purified hydrogen sulfide fraction and the third purified hydrogen sulfide fraction to recover the amine based reagent from the first purified hydrogen sulfide fraction and the third purified hydrogen sulfide fraction.

25. The process as claimed in claim 1 wherein the dissociated first purified hydrogen sulfide fraction is further comprised of hydrogen sulfide and wherein the second separating step is further comprised of obtaining a second purified hydrogen sulfide fraction from the dissociated first purified hydrogen sulfide fraction, wherein the second purified hydrogen sulfide fraction is comprised of hydrogen sulfide.

26. The process as claimed in claim 25 wherein the second purified hydrogen sulfide fraction is obtained by centrifugally separating the dissociated first purified hydrogen sulfide fraction.

27. The process as claimed in claim 25 wherein the second purified hydrogen sulfide fraction is obtained by gravitationally separating the dissociated first purified hydrogen sulfide fraction.

28. The process as claimed in claim 25, further comprising the step of combining the second purified hydrogen sulfide fraction with the first purified hydrogen sulfide fraction.

29. The process as claimed in claim 1, further comprising the step of cooling the dissociated first purified hydrogen sulfide fraction following the dissociating step in order to inhibit recombination of the elemental hydrogen and the elemental sulfur.

30. The process as claimed in claim 29 wherein the cooling step is performed immediately following the dissociating step.

31. The process as claimed in claim 29 wherein the cooling step is comprised of cooling the dissociated first purified hydrogen sulfide fraction to a temperature of less than about the boiling point of the elemental sulfur.

32. The process as claimed in claim 31 wherein the cooling step is performed immediately following the dissociating step.

33. The process as claimed in claim 1, further comprising the step of delivering the hydrogen product to a fuel cell in order to produce electrical energy from the hydrogen product.

34. The process as claimed in claim 33, further comprising the step of using in the dissociating step the electrical energy produced by the fuel cell.

35. An apparatus for obtaining a hydrogen product from a feed gas consisting essentially of an acid gas, comprised of hydrogen sulfide, the apparatus comprising:
    (a) a first separating apparatus for first separating the feed gas to obtain a first purified hydrogen sulfide fraction from the feed gas such that the first purified hydrogen sulfide fraction is comprised of at least about 90 percent hydrogen sulfide by volume;
    (b) a dissociating apparatus for dissociating hydrogen sulfide present in the first purified hydrogen sulfide fraction into elemental hydrogen and elemental sulfur to convert the first purified hydrogen sulfide fraction into a dissociated first purified hydrogen sulfide fraction, wherein the dissociated first purified hydrogen sulfide fraction is comprised of elemental hydrogen and elemental sulfur;
    (c) a second separating apparatus for second separating the dissociated first purified hydrogen sulfide fraction to obtain a hydrogen rich fraction from the dissociated first purified hydrogen sulfide fraction, wherein the hydrogen rich fraction is comprised of elemental hydrogen; and
    (d) a third separating apparatus for third separating the hydrogen rich fraction to obtain the hydrogen product from the hydrogen rich fraction, wherein the hydrogen product is comprised of elemental hydrogen.

36. The apparatus as claimed in claim 35 wherein the dissociating apparatus is comprised of a plasma reactor.

37. The apparatus as claimed in claim 36 wherein the plasma reactor is driven by electromagnetic energy.

38. The apparatus as claimed in claim 37 wherein the electromagnetic energy is comprised of microwave energy.

39. The apparatus as claimed in claim 38 wherein the plasma reactor is capable of providing an operating temperature of between about 1500 degrees Celsius and about 2000 degrees Celsius.

40. The apparatus as claimed in claim 35 wherein the first separating apparatus is comprised of at least one absorber vessel.

41. The apparatus as claimed in claim 40 wherein the first separating apparatus is further comprised of an amine based reagent which is capable of selectively absorbing hydrogen sulfide so that the first purified hydrogen sulfide fraction is absorbed by the amine based reagent.

42. The apparatus as claimed in claim 41 wherein the amine based reagent is comprised of an aqueous solution of a sterically hindered amine.

43. The apparatus as claimed in claim 41 wherein the first separating apparatus is further comprised of a regenerator for recovering the amine based reagent from the first purified hydrogen sulfide fraction.

44. The apparatus as claimed in claim 43 wherein the regenerator is in communication with both of the absorber vessel and the dissociating apparatus so that the first purified hydrogen sulfide fraction passes from the absorber vessel to the regenerator and from the regenerator to the dissociating apparatus.

45. The apparatus as claimed in claim 35 wherein the second separating apparatus is comprised of a second separating apparatus heat exchanger for cooling the dissociated first purified hydrogen sulfide fraction in order to inhibit recombination of the elemental hydrogen and the elemental sulfur.

46. The apparatus as claimed in claim 45 wherein the second separating apparatus is further comprised of a sulfur collector for collecting a sulfur product.

47. The apparatus as claimed in claim 46 wherein the sulfur collector is comprised of a sulfur outlet.

48. The apparatus as claimed in claim 46 wherein the second separating apparatus is further comprised of an outlet for the hydrogen rich fraction.

49. The apparatus as claimed in claim 48 wherein the second separating apparatus is further comprised of a separator for obtaining a second purified hydrogen sulfide fraction from the dissociated first purified hydrogen sulfide fraction.

50. The apparatus as claimed in claim 49 wherein the second separating apparatus is further comprised of an outlet for the second purified hydrogen sulfide fraction.

51. The apparatus as claimed in claim 50 wherein the outlet for the second purified hydrogen sulfide fraction is in communication with the dissociating apparatus so that the second purified hydrogen sulfide fraction is dissociated by the dissociating apparatus.

52. The apparatus as claimed in claim 35 wherein the third separating apparatus is comprised of at least one absorber vessel.

53. The apparatus as claimed in claim 52 wherein the third separating apparatus is further comprised of an amine based reagent which is capable of selectively absorbing hydrogen sulfide so that a third purified hydrogen sulfide fraction is absorbed by the amine based reagent.

54. The apparatus as claimed in claim 53 wherein the amine based reagent is comprised of an aqueous solution of a sterically hindered amine.

55. The apparatus as claimed in claim 53 wherein the third separating apparatus is further comprised of a regenerator for recovering the amine based reagent from the third purified hydrogen sulfide fraction.

56. The apparatus as claimed in claim 55 wherein the regenerator is in communication with both of the absorber vessel and the dissociating apparatus so that the third purified hydrogen sulfide fraction passes from the absorber vessel to the regenerator and from the regenerator to the dissociating apparatus.

57. The apparatus as claimed in claim 53 wherein the first separating apparatus is comprised of at least one absorber vessel.

58. The apparatus as claimed in claim 57 wherein the first separating apparatus is further comprised of an amine based reagent which is capable of selectively absorbing hydrogen sulfide so that the first purified hydrogen sulfide fraction is absorbed by the amine based reagent.

59. The apparatus as claimed in claim 58 wherein the amine based reagent is comprised of an aqueous solution of a sterically hindered amine.

60. The apparatus as claimed in claim 58, further comprising a regenerator for recovering the amine based reagent from the first purified hydrogen sulfide fraction and the third purified hydrogen sulfide fraction.

61. The apparatus as claimed in claim 60 wherein the regenerator is in communication with each of the first separating apparatus, the third separating apparatus and the dissociating apparatus so that the first purified hydrogen sulfide fraction and the third purified hydrogen sulfide fraction pass from the first separating apparatus and the third separating apparatus to the regenerator and from the regenerator to the dissociating apparatus.

62. The apparatus as claimed in claim 61 wherein the regenerator is comprised of a regenerator heat exchanger for heating the first purified hydrogen sulfide fraction and the third purified hydrogen sulfide fraction.

63. The apparatus as claimed in claim 62 wherein the second separating apparatus is comprised of a second separating apparatus heat exchanger for cooling the dissociated first purified hydrogen sulfide fraction in order to inhibit recombination of the elemental hydrogen and the elemental sulfur.

64. The apparatus as claimed in claim 63 wherein the regenerator heat exchanger and the second separating apparatus heat exchanger are associated such that heat from the second separating apparatus is transferred to the regenerator.

65. The apparatus as claimed in claim 35, further comprising a fuel cell for producing electrical energy from the hydrogen product.

66. The apparatus as claimed in claim 65 wherein the fuel cell is electrically connected with the dissociating apparatus so that the electrical energy is used to power the dissociating apparatus.

67. The process as claimed in claim 29, further comprising the step of obtaining a sulfur product from the dissociated first purified hydrogen sulfide fraction, wherein the sulfur product is comprised of elemental sulfur.

68. The process as claimed in claim 1, wherein the first purified hydrogen sulfide fraction is comprised of at least about 94 percent hydrogen sulfide by volume.

69. The apparatus as claimed in claim 35, wherein the first purified hydrogen sulfide fraction is comprised of at least about 94 percent hydrogen sulfide by volume.

* * * * *

UNITED STATES PATENT AND TRADEMARK OFFICE
CERTIFICATE OF CORRECTION

PATENT NO. : 7,455,828 B2 Page 1 of 1
APPLICATION NO. : 10/790530
DATED : November 25, 2008
INVENTOR(S) : Richard R. Selinger and Brian R. Thicke It is certified that error appears in the above-identified patent and that said Letters Patent is hereby corrected as shown below:

ON THE TITLE PAGE, item
(73) Assignee: "Technologies, Ltd." should read --Technologies Inc.--.

Signed and Sealed this

Twenty-sixth Day of January, 2010

David J. Kappos
*Director of the United States Patent and Trademark Office*